United States Patent [19]
Embry et al.

[11] Patent Number: 6,094,689
[45] Date of Patent: Jul. 25, 2000

[54] SYSTEM FOR COUPLING A HOST COMPUTER TO AN IMAGE SCANNER IN WHICH HIGH LEVEL FUNCTIONS ARE MIGRATED TO THE ATTACHED HOST COMPUTER

[75] Inventors: Leo J. Embry, Fort Collins; Daniel G. Franke, Berthoud, both of Colo.

[73] Assignee: Hewlett-Packard Company, Palo Alto, Calif.

[21] Appl. No.: 09/023,349

[22] Filed: Feb. 13, 1998

[51] Int. Cl.[7] ................................................ G06F 13/14
[52] U.S. Cl. ............................ 710/5; 710/62; 710/72; 710/74; 235/474; 235/472; 235/462
[58] Field of Search .................... 235/474, 472, 235/462; 710/5, 62, 72, 74

[56] References Cited

U.S. PATENT DOCUMENTS

| | | | |
|---|---|---|---|
| 3,938,187 | 2/1976 | Subrizi et al. | 710/5 |
| 4,894,522 | 1/1990 | Elliott | 235/462.15 |
| 5,101,490 | 3/1992 | Getson, Jr. et al. | 710/15 |
| 5,659,801 | 8/1997 | Kopsaftis | 710/62 |

*Primary Examiner*—Thomas C. Lee
*Assistant Examiner*—Abdelmoniem Elamin

[57] ABSTRACT

Methods and apparatus for coupling a host system to an image scanner in which high-level functions are migrated out of the scanner control module up to the attached host system. The host system and the scanner, via its control module, communicate using a low-level control instruction set. The low-level control instruction set enables the host system to directly control the scanning process by reading and writing memory locations within the control module. The memory locations include data structures descriptive of control operations to be performed by the scanner control module as well as status to be reported from the scanner to the host system. The low-level control instruction set includes instructions generated by the host system requesting return of particular data from memory locations in the scanner control module as well as instructions requesting the writing of particular data to memory locations in the scanner control module. Host based elements translate high-level scanner commands received, for example, from application programs into corresponding sequences of low-level control instructions. In particular, the present invention may be advantageously applied to translate Hewlett-Packard Scanner Control Language (SCL) requests into low-level control instruction sequences (also referred to as Scanner Primitive Language or SPL). Shifting computation and memory requirements from the scanner control module to the host system substantially simplifies scanner control module design enabling production of lower cost scanning devices.

21 Claims, 13 Drawing Sheets

SYSTEM FOR COUPLING A HOST COMPUTER TO AN IMAGE SCANNER IN WHICH HIGH LEVEL FUNCTIONS ARE MIGRATED TO THE ATTACHED HOST COMPUTER

BACKGROUND OF THE INVENTION

1. Field of the Invention

The present invention relates to image scanning devices and in particular describes an architecture (methods and associated apparatus) for simplified control of an image scanning device connected to a computer system.

2. Description of Related Art

Peripheral I/O devices generally attach to a computer system via an interface adapter (often referred to as a host adapter). It is common that the interface adapter provides a standard signal and protocol such as Small Computer System Interface (SCSI), parallel, serial, or Hewlett-Packard Interface Bus (HPIB). In particular over such standard bus interfaces, peripheral devices often posses significant processing power for performing their respective I/O tasks in an optimal fashion. For example, disk drives often posses substantial buffering and processing power to permit the disk drive to optimally execute I/O requests by minimizing read/write head movement. Or, for example, printer peripheral devices may include significant processing power to permit interpretation of a printer command language (e.g., Hewlett-Packard PCL) for control of the printer operation.

Image scanning devices are computer peripheral devices which optically scan an image source (i.e., a photographic image or printed text document) to produce a digital representation of that image. There are a number of different types of scanners including, for example, flat-bed page scanners, sheet-fed page scanners, photographic image scanners, etc. All such devices share a common architecture in that the colors and shapes of the source image are converted to a digital representation. In a digital representation, the continuous image source is transformed into a two-dimensional array of picture elements (commonly referred to as "pixels" or more simply as "dots"). Each pixel includes digital (i.e., numeric) information describing the colors and intensity of that pixel. The digital information in the array of pixels visually appears to recreate the original image source. The image is therefore said to be digitized.

The digitized image resolution is commonly measured in pixels per inch (often referred to as dots per inch or DPI). The higher the image resolution, the better the quality of the image reproduction by the image scanner because the sharp boundaries between individual pixels is less visible to the naked eye. Mathematical, digital image processing techniques are frequently applied to the digitized image to improve the apparent image quality both in terms of color accuracy and resolution as well as smoothing of the harsh visual boundaries between pixels caused by the digital nature of the digitized stored image.

Image scanning devices, as presently known in the art, include significant processing power for purposes of controlling the image scanning operations, processing a complex command language, complex host communication protocols and medium, and for purposes of manipulating the digitized image. In particular, large amounts of memory may be required within present scanner controllers to perform SCSI protocol communication with a host system or for parallel port interfacing to a host system (often used in place of SCSI interfacing to allow simpler installation). Furthermore, the image processing capabilities of the scanner device require substantial processing capability and memory to perform relatively complex mathematical transformations of the image data. Still additional memory and processing power is utilized within present scanners to process rich, but often complex, command languages.

By contrast, relatively little processing power is required for the basic, real time operation of the scanner device and for transfer of the raw scanned image data devoid of special image processing and enhancement (i.e., the motion control of the image source or scanner optical assemblies).

Because of the relatively high computation performance and memory size required within controllers of present scanner devices, complexity and associated costs have remained relatively high in scanning devices. CPU's capable of providing the requisite mathematical image processing capability at the desired performance level are a costly component in the overall scanner costs. Memory devices also comprise a significant component in the cost and complexity of control devices within image scanners. It is therefore a problem in scanner devices to maintain a level of performance required to provide sophisticated command processing, host communications, and digital image processing while reducing the complexity and hence costs of scanning devices.

SUMMARY OF THE INVENTION

The present invention solves the above and other problems, thereby advancing the state of the useful arts, by providing methods and associated apparatus for simplifying the control electronics and methods operable within an image scanning peripheral device. More specifically, the present invention relieves the control electronics within the image scanning device of responsibility for complex command processing, from complex host communications, and from significant mathematical processing required for image processing features, all as presently performed with present scanning devices. In so eliminating the need for significant processing power and memory within control modules of the image scanner device, the present invention notably simplifies the image scanner device to thereby reduce costs of such a device. Command processing previously performed within image scanning devices is migrated to an attached host computer in favor of a dramatically simplified low-level control instruction set supported by the scanner in accordance with the present invention. Image processing functions previously performed within the image scanner device are also migrated into the attached computer systems (e.g., personal computer or workstation). Host computer system communications is simplified by use of simpler, standard communication protocols and medium. Present host computer systems possess substantial computational power and memory capacity relative to the simplified scanner of the present invention. The computational power of the attached computer system is therefore utilized for complex command set processing and complex digital image processing features required to enhance a raw scanned image.

More specifically, the scanner architecture of the present invention provides for a low-level interface between software modules on an attached computer system and simplified control firmware within the scanner of the present invention. The low-level interface preferably includes a simple command set whereby host system software has direct access to a memory mapped I/O interface of the process control functions of the simplified scanner device. For example, the interface may include direct access to "registers" defined within the control firmware and processor to permit the host system software to directly control the scanning process and overall operation of the scanner device.

The simplified control operations in accordance with the scanner architecture of the present invention include management of host system I/O, management of user input operations direct to the scanner (e.g., operator panel operations and source image media insertion and removal), and real time control of the scanning process.

Additional advantages of the invention will be set forth in part in the description which follows, and in part will be obvious from the description, or may be learned by practice of the invention. The advantages of the invention may be realized and attained by means of instrumentalities and combinations particularly pointed out in the appended claims and depicted in the figures as follows.

DETAILED DESCRIPTION OF THE PREFERRED EMBODIMENTS

Figure 1:
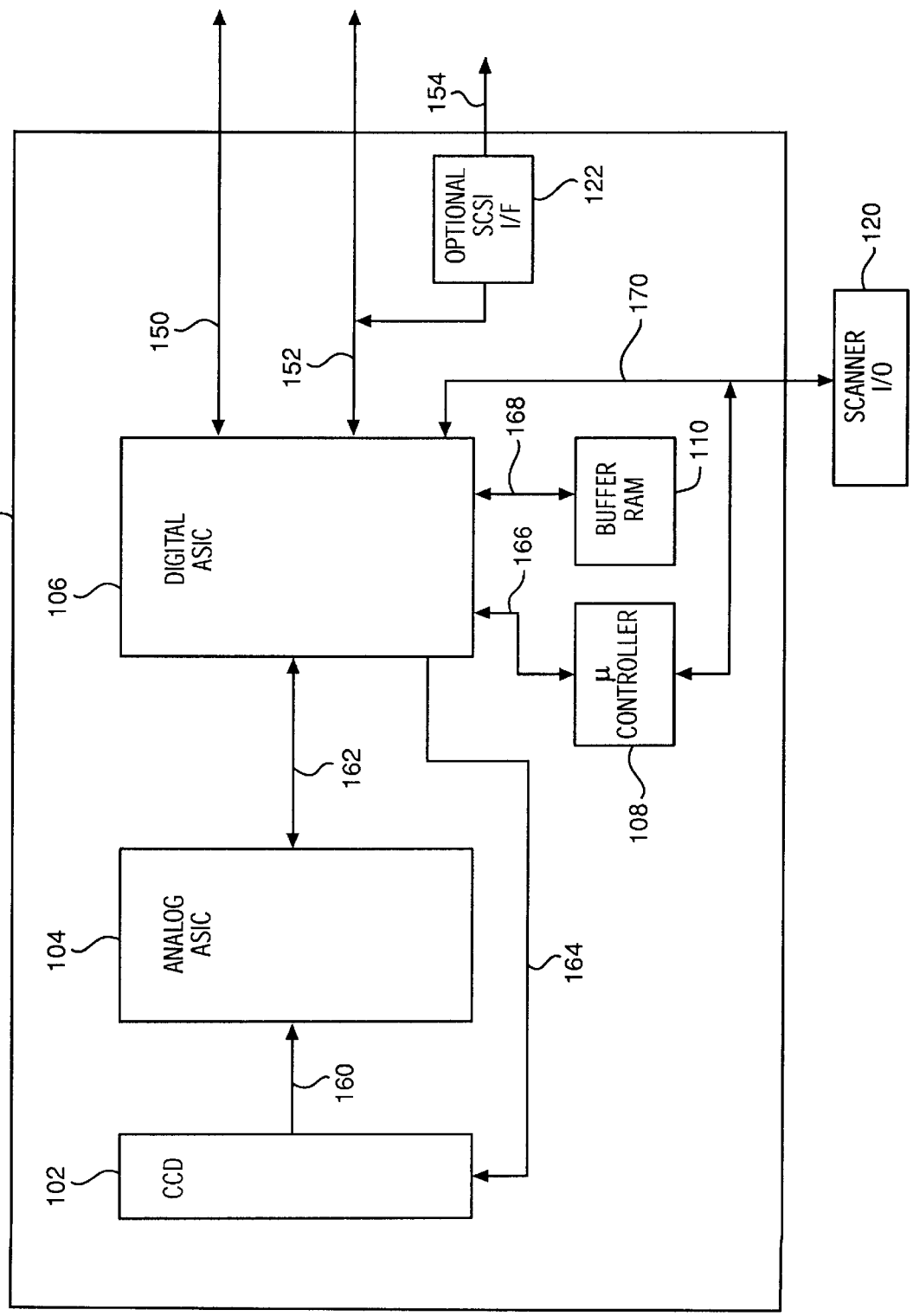
FIG. 1 is a block diagram of a simplified scanner control module in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting a simplified scanner control module in accordance with the present invention. Scanner control module 100 includes an analog ASIC 104 adapted to the received analog signals from CCD array 102 via path 160. Analog ASIC 104 includes all circuits required for amplification, multiplexing, and analog to digital conversion of the analog signals received from CCD array 102.

Digital ASIC 106 includes additional circuitry and logic providing an interface between the various digital components describe below, including: stepper motor controls, pixel and data compression, buffer management, and host communication. In particular, digital ASIC 106 provides in interface mechanism for microcontroller 108 to manage the overall operation of scanner control module 100. Access to buffer RAM 110 is managed by digital ASIC 106 to coordinate buffer access required by microcontroller 108, buffering of scanned digitized image data, and transmission and reception of data to or from the host computer. Digital ASIC 106 provides coordinated access to buffer RAM 110 via bus 168. Digital ASIC 106 furthermore controls parameters low the operation of CCD array in 102 to adapt the CCD sensing as required for particular media and other parameters. Microcontroller 108 and digital ASIC 106 transmit control signals and receive status signals to and from scanner process I/O 120 via bus 170. Scanner process I/O 120 includes user interface buttons, lights, and sensors associated with user operation of the image scanner.

As noted above, scanner control module 100 preferably interfaces with a host computer via a simplified communication medium 150. Medium 150 is preferably a universal serial bus (USB). Digital ASIC 106 provides interface control mechanisms to operate USB 150. In addition, digital ASIC 106 provides a general-purpose parallel bus 152 capable of adaptation to a number of parallel bus structures. In particular, an optional SCSI interface 122 may be associated with parallel bus 152 to provide SCSI interfacing via SCSI bus 154. The preferred host interface connection is dependent upon the particular application environment in which scanner control module 100 is utilized but USB 150 is generally preferred where applicable for its inherent simplicity.

As noted above, simplified scanner control module 100 preferably interprets a scanner primitive language (SPL) which enables the dramatic simplification of scanner control module 100 as compared to prior techniques and apparatus. Scanner control module 100 of the present invention is therefore dependent upon a cooperating host computer which provides low-level control instructions in the SPL format. Most present scanner's utilized a high-level command language for communication and with host systems. For example, present Hewlett-Packard scanner is communicate with host computers utilizing the scanner control language (SCL) standards. The SCL standards and are defined and documented by a Hewlett-Packard Co., 700 71st Avenue, Greeley, Colo. 80634. Specifically, a document entitled *Scanner Control Language (SCL) and C Language Library for Hewlett-Packard Scanners* defines the SCL language and a standard API for access to such compatible scanners.

Figure 2:
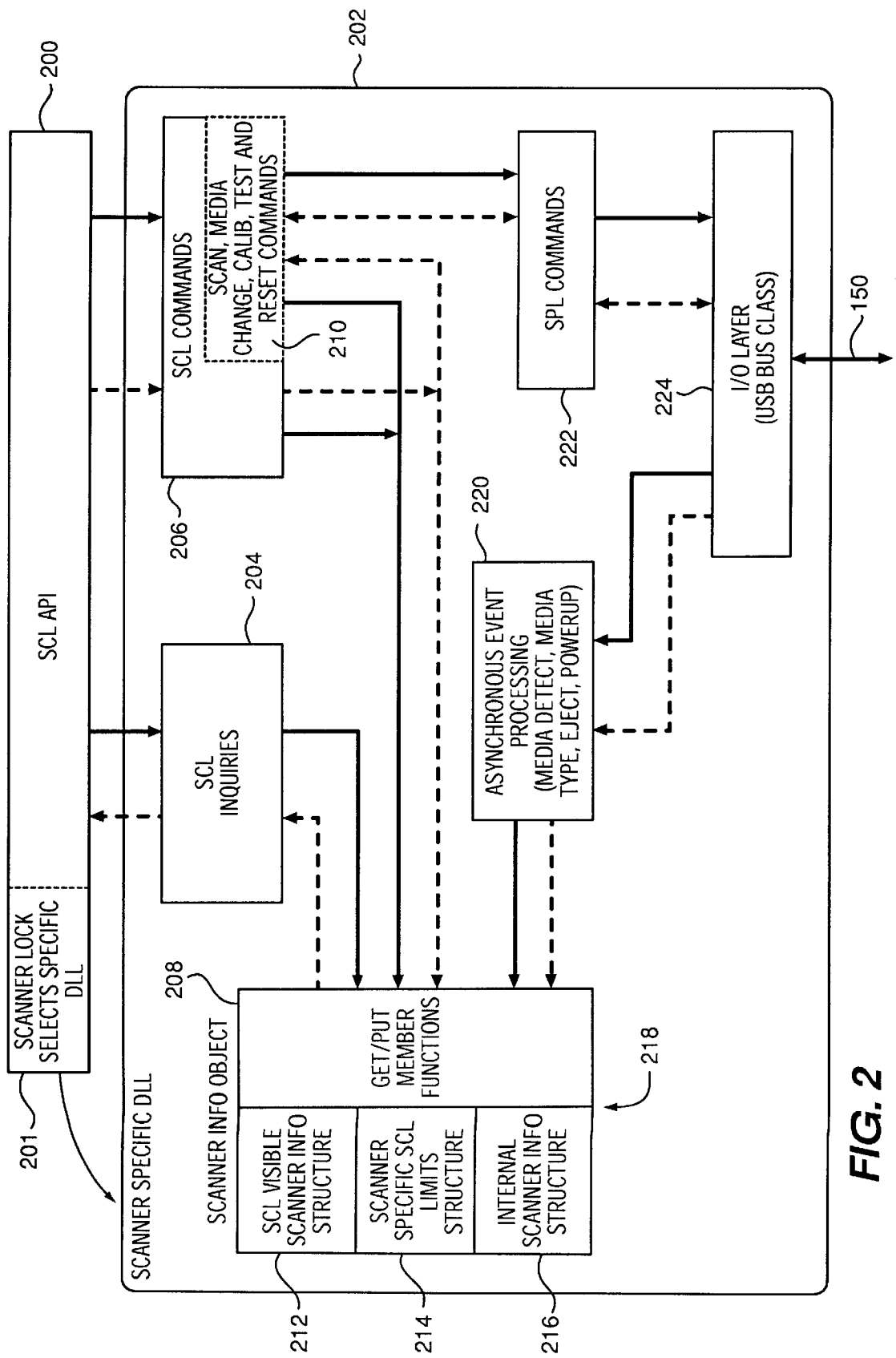
FIG. 2 is a block diagram of a host based software API operable in conjunction with the scanner device of FIG. 1.

FIG. 2 is a block diagram of a software module operable on a host computer in accordance with the present invention to transform high-level SCL operations into lower-level (SPL) control instructions. Such low-level control instructions are then transmitted to the scanner control module 100 of FIG. 1. In particular, element 200 of FIG. 2 represents a software API providing an SCL standardized interface to an application program. Included within the API 200 is a scanner selection and lock module 201. The scanner selection and lock module 201 loads a scanner specific DLL for control of a particular scanner device. Various classes of scanner devices may share a particular scanner specific DLL. Specifically, scanner specific DLL 202 represents a DLL in accordance with the present invention which is adapted to translate high-level SCL commands and status into an equivalent set of SPL control instructions and status requests.

Scanner specific DLL 202 includes an SCL command module 206 and an SCL inquiries module 204. Scanner info object 218 is a repository for various data elements describing and controlling an SCL compatible scanner. Scanner info object 218 includes get/put member functions 208 to manipulate the various data elements within the scanner info object 218. The various data elements include SCL visible scanner info structure 212, scanner specific SCL limits structure 214, and internal scanner info structure 216. SCL inquiries module 204 performs requisite inquiry processing and returns requested information to SCL API 200. SCL inquiries module 204 satisfies such requests via get/put member functions 208 in scanner info object 218.

Certain other SCL commands processed via SCL commands module 206 are similarly satisfied exclusively by access to scanner info object 218. Other SCL commands require interfacing with the scanner device via corresponding sequences SPL commands. Module 210 within SCL commands module 206 suggests various commands which require such interactions with the scanner control module 100. For example, commands to initiate the scan and receive resultant digitized data, commands to change the type of media scanned, commands to calibrate, test, and reset the scanner device, require interactions with the scanner device. For such commands, module 210 interacts in with SPL commands module 222 to generate corresponding sequences of low-level control instructions in accordance with the SPL definitions herein below.

SPL commands module 222 transmits low-level control instructions through I/O layer 224 to scanner control module 100 of FIG. 1 via USB bus 150. Asynchronous status or event information as well as data in response to low-level control instructions generated by SPL commands module 222 are also returned through USB bus 150 and I/O layer 224. In particular, asynchronous event information such as media insertion detection, media type changes, media ejection requests, or power up status, are returned via USB bus 150 through I/O layer 224 into asynchronous event processing module 220. Asynchronous event processing module 220, in turn, updates information in scanner info object 218. Asynchronous processing module 220 preferably operates as a background task (a background thread) operable concurrently with other operations of the API module to process information received asynchronously from the scanner device.

Those skilled in the art will readily recognize that the block diagrams of FIGS. 1 and 2 are intended only as exemplary of the architecture of the present invention. Various other modular decomposition's of the host software modules depicted in FIG. 2 as well as circuit groupings and circuit integration as depicted in FIG. 1 may be useful in embodying the methods and apparatus of the present invention.

Low-level control instructions

The present invention is primarily characterized in that the scanner control module processes low-level control instructions as distinguishable from high-level command languages as presently known in image scanners. In particular, "low-level control instructions", as used herein, means a command or control language which includes commands to directly manipulate memory locations within the scanner control module. Furthermore, as used herein, "memory locations" includes any location directly accessible via an address value. For example, "memory locations" as used herein includes registers within microcontroller 108, memory locations within buffer RAM 110, and parameter registers and values within analog ASIC 104 and digital ASIC 106. Furthermore, such addressable memory locations includes predefined data structures identified by address values within the low-level control instructions. Fundamentally therefore, low-level control instructions as used herein includes commands for reading identified memory locations within the scanner control module and for writing values to identified memory locations within scanner control module.

FIGS. 3 through 6 are abstract block diagrams depicting four common control sequences for reading or writing corresponding predefined data structures within scanner control module 100. As noted above, the specific location of such data structures is a matter of design choice well-known to engineers skilled in the art. For example, the data structures exemplified in FIGS. 3 through 6 may physically reside within registers, ROM, or RAM of microcontroller 108, may reside within buffer RAM 110, or may reside within structures in analog ASIC 104 or digital ASIC 106.

Figure 3:
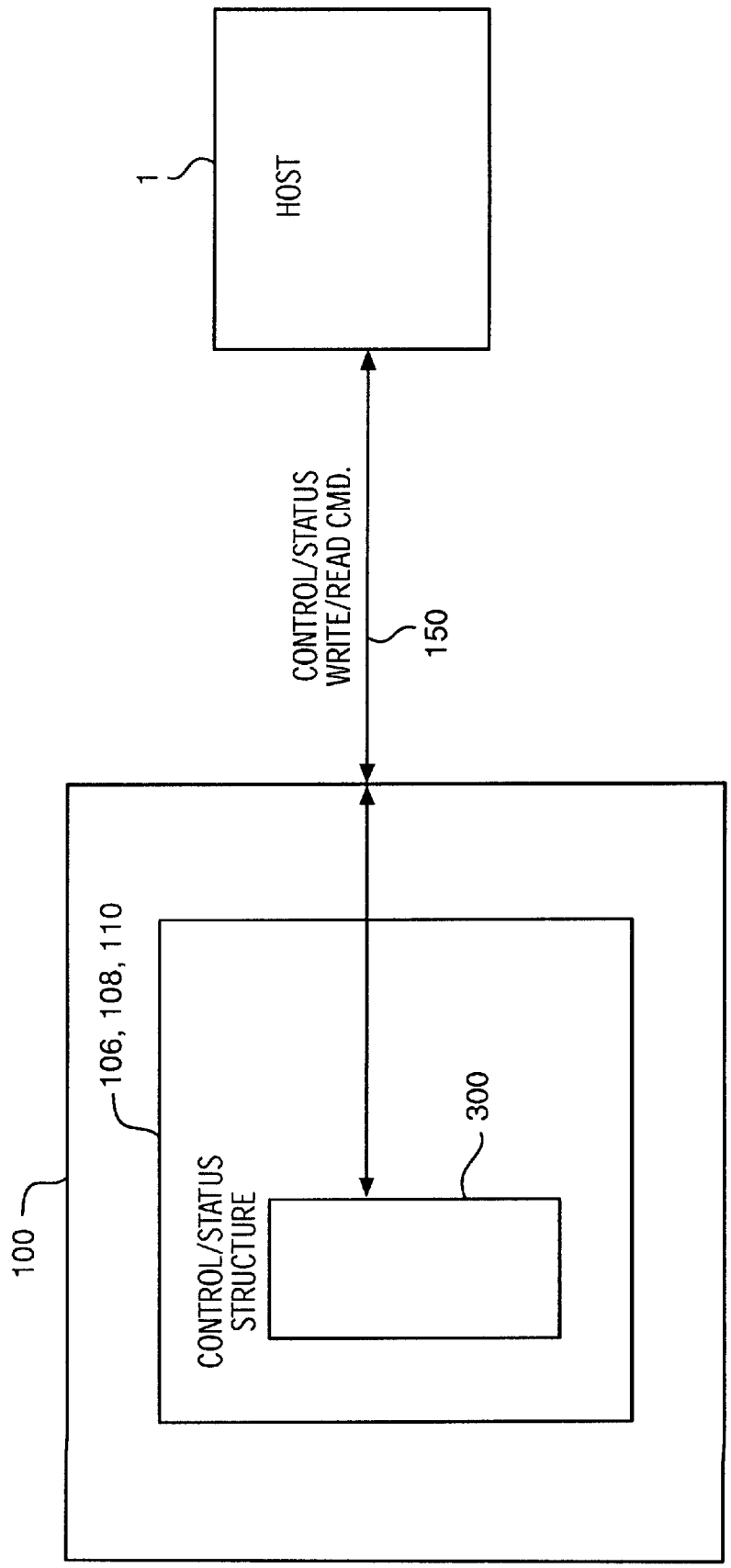
FIG. 3 is a block diagram describing the operation of the present invention to send low-level control sequences between a host system and a scanner control module in accordance with the present invention to read or write a control/status data structure.

FIG. 3 shows a host computer 1 (embodying the software API and structures of FIG. 2) transmitting control/status data structure read/write commands via USB bus 150 to scanner control module 100. Control/status data structure 300 is shown embodied within digital ASIC 106, microcontroller 108, and buffer RAM 110, collectively. This notation in FIG. 3 is intended to suggest that the physical location of control/status data structure 300 is largely insignificant as regards the architecture and operation of the present invention. The location is relevant only to the extent that it is stored within scanner control module 100 in a manner that is addressable by low-level control instructions sent by a host computer. In particular, the write command is issued by host computer 1 instructing scanner control module 100 to write to the host supplied data into control/status data structure 300. Similarly, a read command is issued by host computer 1 instructing the scanner control module 100 to retrieve identified data from control/status data structure 300 and to return the requested data to host computer 1.

Figure 4:
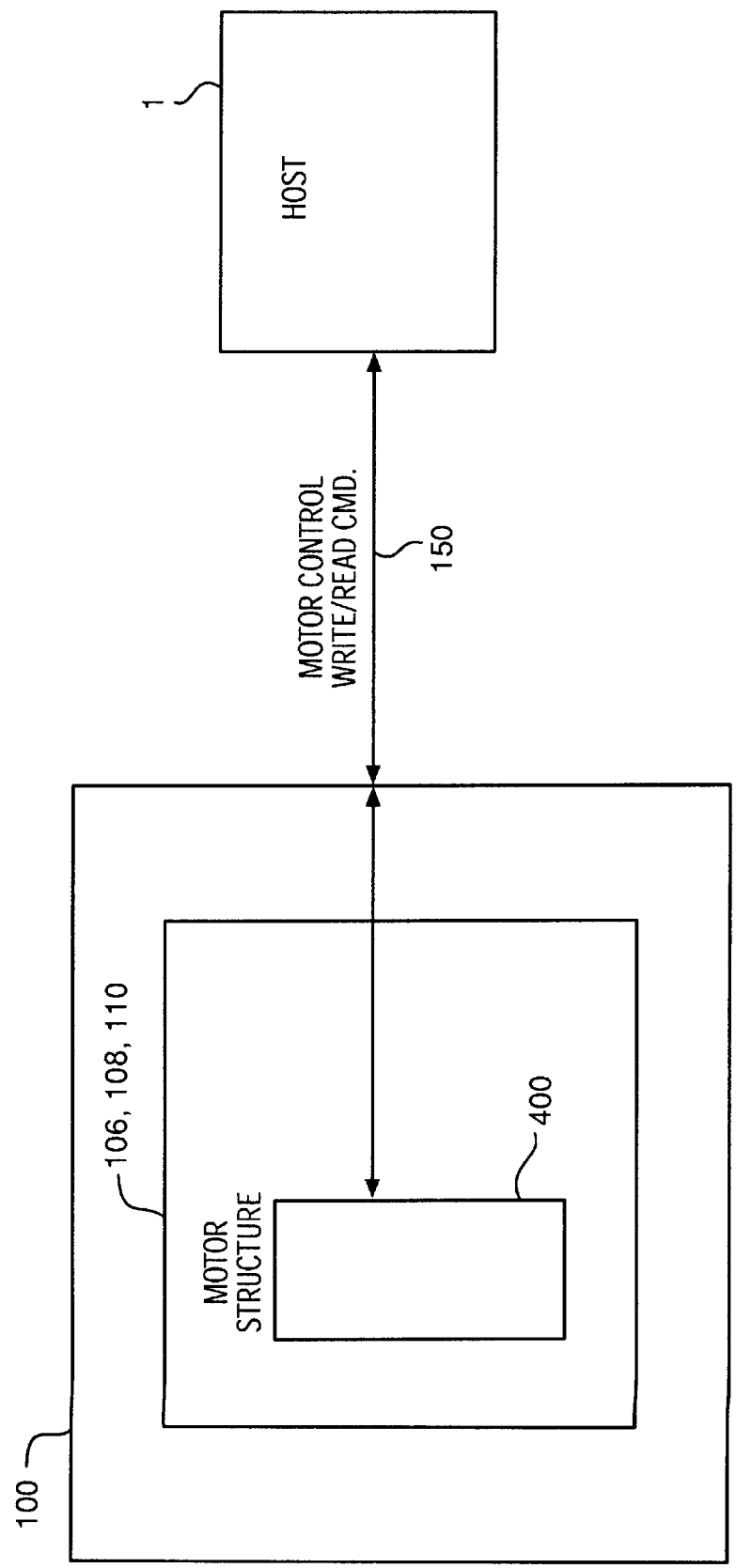
FIG. 4 is a block diagram describing the operation of the present invention to send low-level control sequences between a host system and a scanner control module in accordance with the present invention to read or write a motor data structure.
Figure 5:
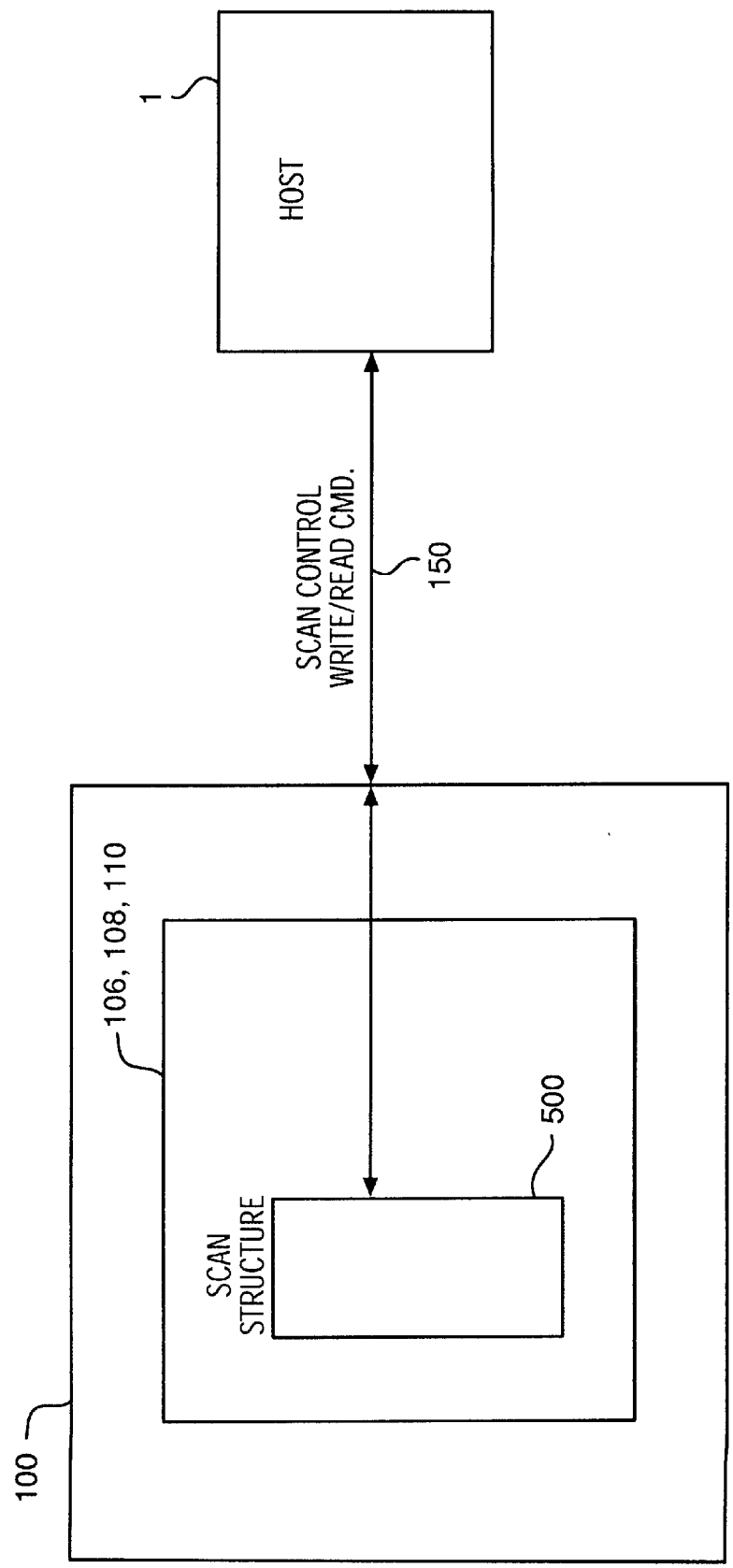
FIG. 5 is a block diagram describing the operation of the present invention to send low-level control sequences between a host system and a scanner control module in accordance with the present invention to read or write a scan control data structure.
Figure 6:
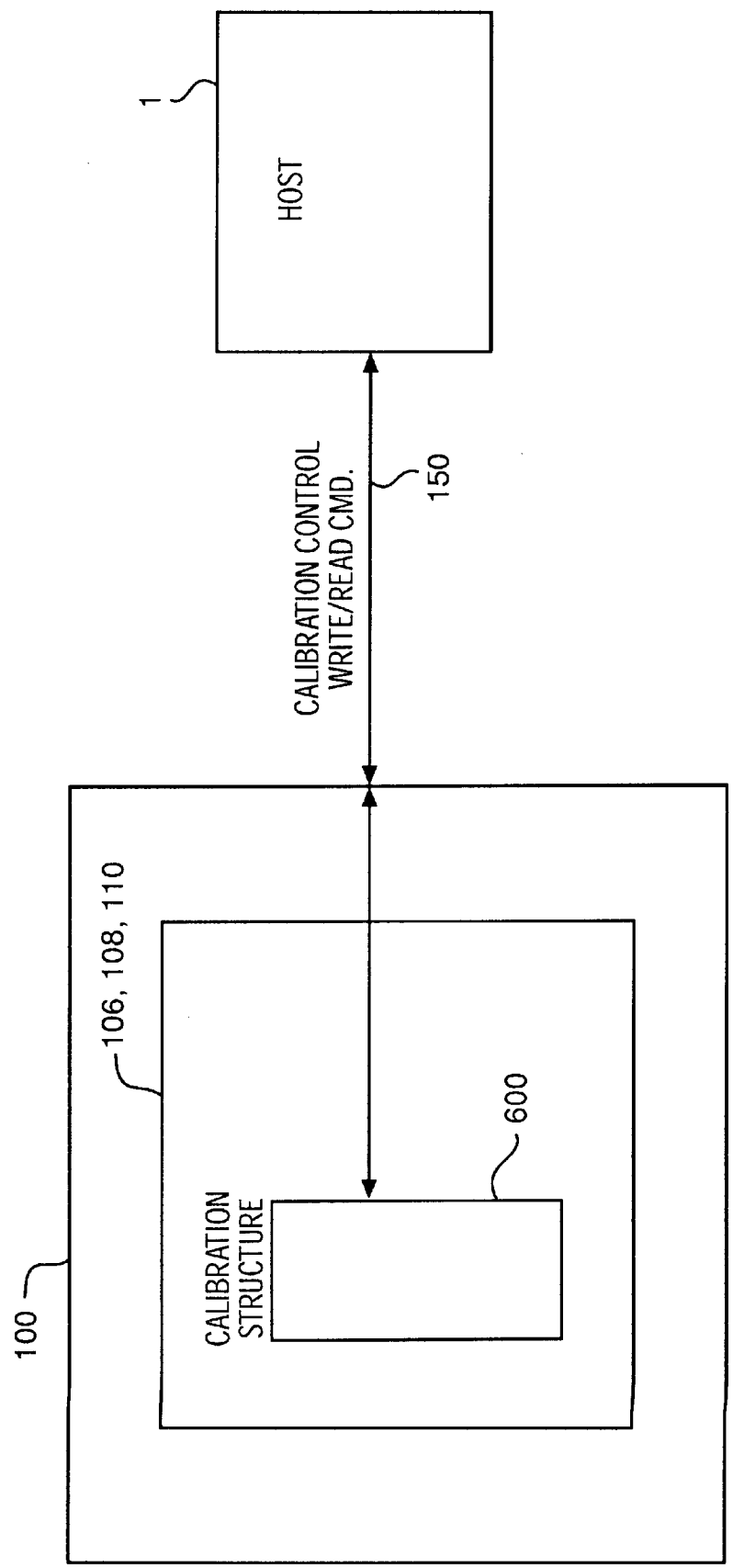
FIG. 6 is a block diagram describing the operation of the present invention to send low-level control sequences between a host system and a scanner control module in accordance with the present invention to read or write a calibration data structure.

FIG. 4 is identical to FIG. 3 except that it exemplifies read and write commands used to manipulate data in a motor data structure 400. Likewise, FIG. 5 shows use of such a read and write commands to manipulate a scan data structure 500, while FIG. 6 depicts the use of read and write commands for manipulation of a calibration data structure 600. Details of the structure and semantic meaning of data within these various data structures is provided herein below.

Host API

As noted above with respect to FIG. 2, the present invention includes host computer-based software providing an applications program interface (API) for translating high-level command language sequences (i.e., SCL command sequences) into low-level control instructions as discussed herein. This API provides translation so as to permit existing application programs to utilize well-known high-level command language structures (i.e., SCL command sequences)

with simplified scanners using a low-level control instruction sequence in accordance with the present invention (i.e., SPL sequences).

Figure 7:
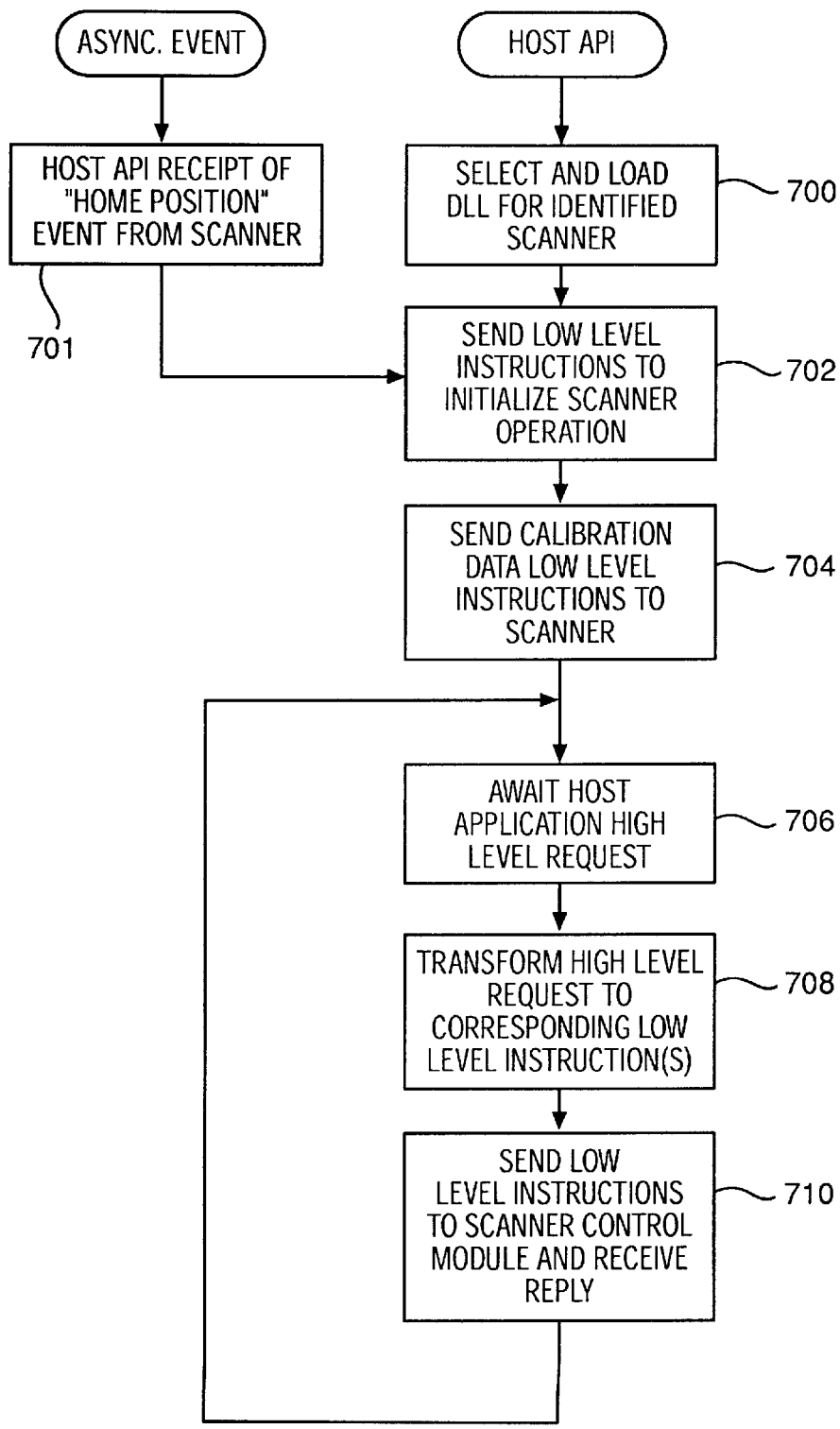
FIG. 7 is a flowchart describing the methods of the present invention operable in the host API software module in accordance with the present invention.

FIG. 7 is a flowchart describing the operation of a host API module operable in a host computer connected to a scanner device operable in accordance with the present invention. Element 700 is first operable to select and load an appropriate DLL for an identified scanner device. As used herein, DLL is intended to represent any library module which may be dynamically linked or otherwise associated with an application program. Well known programming techniques are utilized to associate a particular DLL with an identified scanner device. Element 702 is next operable to generate low-level control instructions sequences required to initialize the identified scanner device for operation. Such initialization sequences prepare the scanner for scanning particular types of media at desired resolutions, etc.

Element 704 is then operable to transmit current calibration data to the SPL compatible scanner device using low-level control instructions. Those skilled in the art will readily recognize that the initialization and calibration data transmitted by operation of elements 702 and 704 may also be stored within non-volatile memory of the scanner control module 100. In the preferred embodiment of the present invention, most persistent data storage relating to operation of the scanner device is maintained within the host computer (managed by the appropriate DLL) to further reduce memory requirements of the scanner control module, in turn, further simplifying the scanner device in accordance with the present invention.

In the preferred embodiment, there is an initialization sequence to prepare the scanner device for each scan operation. More specifically, the host API DLL module preferably generates a first initialization sequence when it first connects with the scanner device and preferably generates a second initialization sequence when it prepares for each scan operation. In addition, in the preferred embodiment of the present invention, the host API DLL module preferably generates yet another initialization sequence when it receives asynchronous event input from the scanner device (e.g., via module 220 of FIG. 2) indicating that the scanner control module is at "home position" as discussed in further detail herein below. Element 701 of FIG. 7 therefore indicates that initialization and calibration information (as discussed above with respect to element 702 and 704) are generated in response to asynchronous receipt at the host API of a "home position" event message from the scanner device. In particular, when element 701 detects receipt of such an event message, a background thread in the host API (e.g., element 220 of FIG. 2) generates and transmits to the scanner appropriate initialization sequences to reset the scanner device in preparation for another scan operation.

The various initialization sequences consist essentially of low level control instructions (SPL instructions) as discussed herein below. Certain such initialization sequences may, for example, consist of calibration operations to prepare the scanner for future operations. Such calibration operations are in essence simply another scan sequence wherein the status of particular sensors are determined and control of motors and other devices are performed for the specific purpose of calibrating the device. Still other initialization sequences may include, for example, downloading updated firmware stored on the host system into the memory of the scanner control module and instructing the scanner control module to switch to operating under the newly loaded firmware.

All such initialization sequences are no more than particular sequences of the SPL control instructions generated by the host API DLL module and supported by the scanner control module in accordance with the present invention.

Element 706 is next operable to await receipt of a high-level command sequence request from the host application program. Element 708 is then operable to transform such a high-level command request (i.e., an SCL command sequence) into a corresponding sequence of low-level control instructions (i.e., compatible with the SPL control instruction format described herein below). Element 710 is then operable to transmit the low-level control instructions generated by operation of element 708 to the scanner control module and is further operable to receive any reply data generated from the scanner control module. In particular, if the command sequence sent to the scanner control module includes a read memory location low-level control instruction, the data requested is returned by the scanner control module and received by operation element 710 in the host computer. Processing then continues by looping back to element 706 and repeating the process.

As noted above with respect to FIG. 2, processing of certain high-level command requests may involve manipulation of data exclusively within the host computer DLL module. FIG. 7 is directed primarily toward processing of high-level command sequences which require interaction with the SPL compatible scanner device (as noted above with respect to module 210 of FIG. 2).

Scanner Device Operation

Operation of a scanner device in accordance with the present invention is controlled by scanner control module 100 of FIG. 1. In the preferred embodiment, scanner control module 100 includes firmware operable in microcontroller 108 and is logically divided into three primary functional areas: host I/O, user input, and real-time control.

The host I/O functional area of the scanner control module firmware primarily involves configuring and operating USB bus 150 (or other host communication buses i.e., 152 or 154), receipt and processing of low-level control instructions from the attached host computer, returning to the host any requested data in accordance with processing of control instructions, and return of digital scanned image data to the host.

The user input functional area of the scanner control module firmware involves interaction with the scanner process I/O 120 to sense parameters of the device controlled by a user. For example, the open or closed state of the lid on the scanner device may be sensed by the user input functional area. Also, the presence or absence of a media for scanning, selection of a particular media type, and a user request to eject an inserted image medium may be sensed by the user input functional area of the scanner control module firmware. This area of the firmware is also responsible for control of output signals intended for user interaction such as indicator LED's or displays.

The real-time control functional area of the scanner control module firmware involves interaction with real-time events occurring within the scanner device in accordance with present invention. Such real-time events include: control and status of the motor within the scanning device, scanning events relating to the control of the optical imaging devices (CCD array), and timer events which aid the scanner control module in timing the sequence of various operations.

The three functional areas of scanner control module firmware include interrupt driven components which initially receive interrupt events generated by the scanner imaging components, the motors, the host communication link, and the scanner process I/O as well as task level components which process the various events in a desired sequence as required for control of the scanner. The components interact as required through any of several well-known inter-process communication techniques including shared global variables and flags. Those skilled in the art will readily recognize many equivalent real-time control structures and architectures which may embody the methods in apparatus of the present invention.

Figure 8:
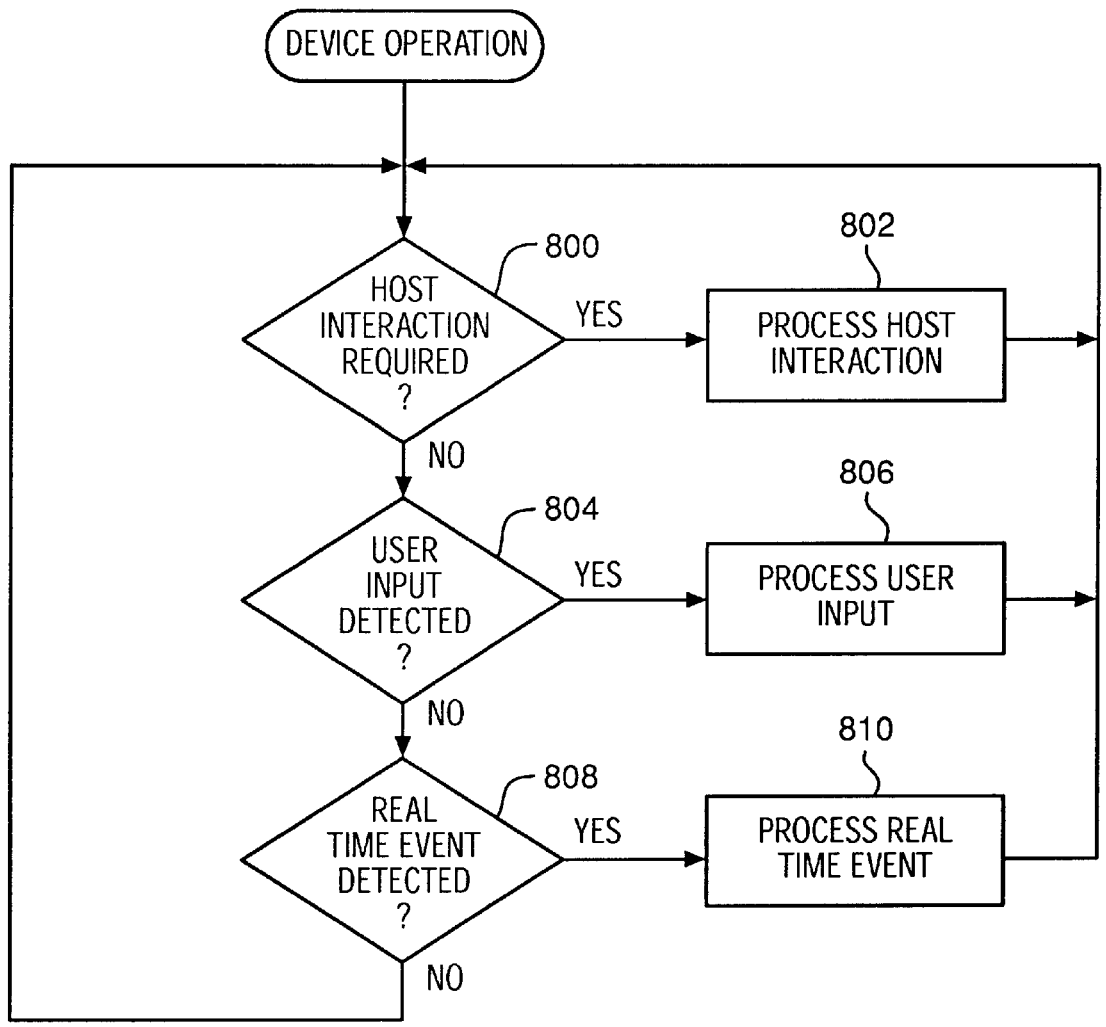
FIG. 8 is a flowchart describing the methods of the present invention operable within the scanner control module of the present invention in cooperation with the host API of FIG. 7.

FIG. 8 is a flow chart describing the high-level operation of the present invention with regard to these three functional areas of the scanner control module firmware. As noted above, those skilled in the art will recognize a number of equivalent real-time control structures and architectures which may embody the methods and apparatus of the present invention. FIG. 8 is therefore intended merely as exemplary of one particular embodiment of the scanner control module firmware in accordance with the present invention.

Elements 800 and 802 are operable to receive and process low-level control instruction sequences received from an attached host computer system. In particular, element 800 determines whether any such control instruction sequences have been received and are awaiting processing within the scanning device. Preferably, any received control instructions are awaiting processing within a FIFO associated with the USB bus 150. Such buffered communication techniques and apparatus is well known to those skilled in the art. If unprocessed instructions are awaiting processing, element 802 is next operable to process any such low-level control sequences received from a host computer. Processing then continues by looping back to element 800. If element 800 determines no host generated low-level control instruction sequences are awaiting processing by the scanning device, elements 804 and 806 are next operable to process any pending user input information. Specifically, element 804 determines whether any user input operations have been detected such as depression of an eject button, lifting of the lid, insertion of a media for scanning, etc. If such a user input operation is detected, element 806 is next operable to process the detected user input operation. Processing then continues by looping back to element 800 to await a next operation or event. If element 804 determines that no user input processing is required at present, element 808 is next operable to detect the occurrence of a real-time event requiring the attention and processing by the scanner control module. If such a real-time event is detected, element 810 is next operable to process the detected real-time event including, for example, motor or motion operations, scanning related events and positioning, or timer event occurrence. Processing then continues by looping back to element 800 to await a further processing.

Figure 9:
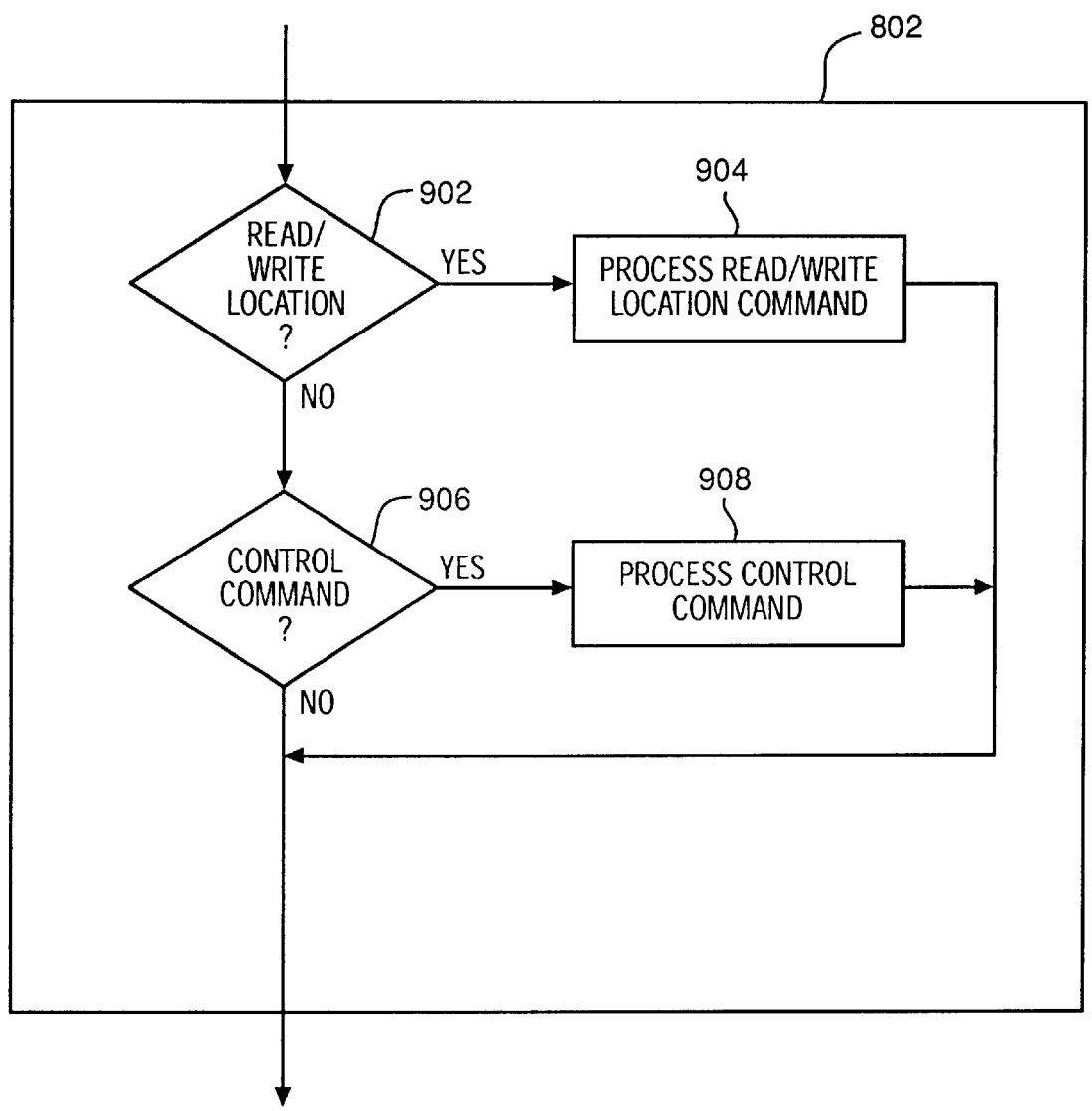
FIG. 9 is a flowchart describing additional details of the operation of elements in FIG. 8.

A FIG. 9 is a flow chart describing the operation of element 802 of FIG. 8 in additional detail. In particular FIG. 9 describes more detailed operation of element 802 for processing low-level control instruction sequences received from a host computer. Element 902 and 904 are operable to process any of several read/write memory location commands. As noted above, memory locations as used herein refers to any locations in the scanner control module used to store control, status, and parameter information regarding operation of the image scanning device which are directly accessible by a host computer using low-level control instructions. Examples of such memory locations include registers and structures stored within microcontroller 108 as well as registers and structures stored within digital ASICs 104 and 106 or buffer RAM 110. If element 902 determines that the received low-level control instructions sequence indicates a request to read or write identified memory locations, processing continues with element 904. Element 904 performs processing required to write the host supplied data into the specified location or to retrieve and return the identified data from specified location to the host computer. Processing is thus completed for element 802. It element 902 determines that the control instruction sequence was other than a read/write location control sequence, element 906 is next operable to determine if the received control instruction sequence requests a particular control function be performed. If so, element 908 is next operable to process the received control instruction sequence. Processing is then completed for element 802. Details of specific read/write memory location control sequences and control command sequences are discussed in additional detail herein below.

Figure 10:
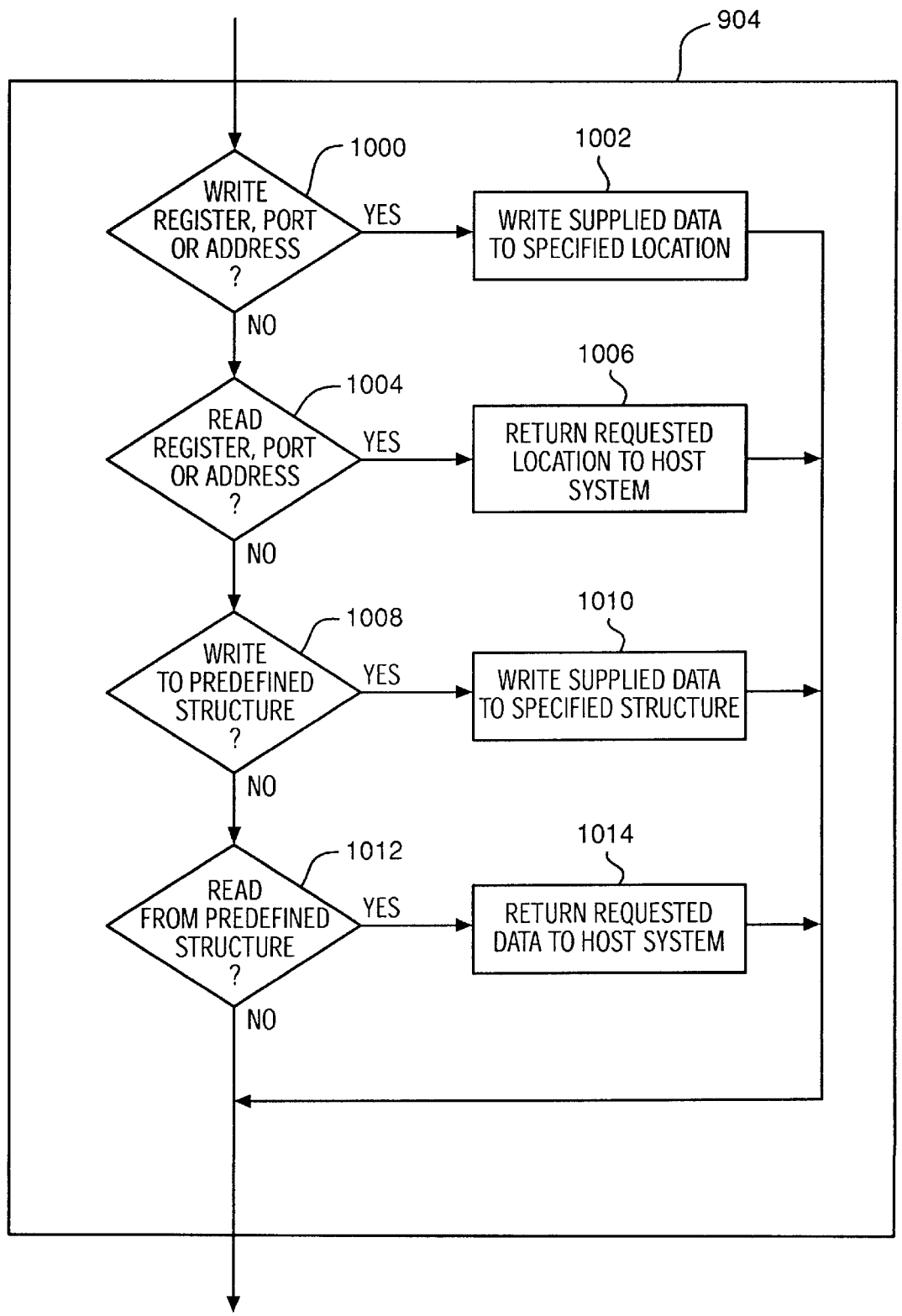
FIG. 10 is a flowchart describing additional details of the operation of elements in FIG. 9.

FIG. 10 is a flow chart describing the operation of element 904 in additional detail. Element 904 is operable to process a received read/write memory locations control requests from a host computer. In particular, elements 1000 and 1002 are operable to process write instructions requesting the write of supplied data to an identified register, I/O port or memory address. Element 1000 is first operable to determine whether the control instruction sequence is requesting the write of a particular register, I/O port or memory address. If so, element 1002 is next operable to write the host supplied data to the specified memory location. Processing is then complete for element 904. If element 1000 determines the request is not for a write to a memory location, element 1004 is next operable to determine whether the control instruction sequence is requesting the read of an identified register, I/O port, or memory address. If so, element 1006 is next operable to retrieve data stored at the identified location and return the retrieve the data to the host system. Processing is then complete for element 904. If element 1004 determines that the request is not for reading of a memory location, element 1008 is next operable to determine if the request is for a write to a predefined data structure. If so, element 1010 is next operable to write the host supplied data to the specified data structure. Processing is thereby completed for element 904. If element 1008 determines that the request is not for writing to a predefined data structure, element 1012 is next operable to determine if the control instruction sequence requests a read of data stored in a predefined data structure. If so, element 1014 is next operable to return data retrieved from the identified predefined structure to the host system, thereby completing operation of element 904. Details of specific memory locations and predefined data structures are provided herein below.

Figure 11:
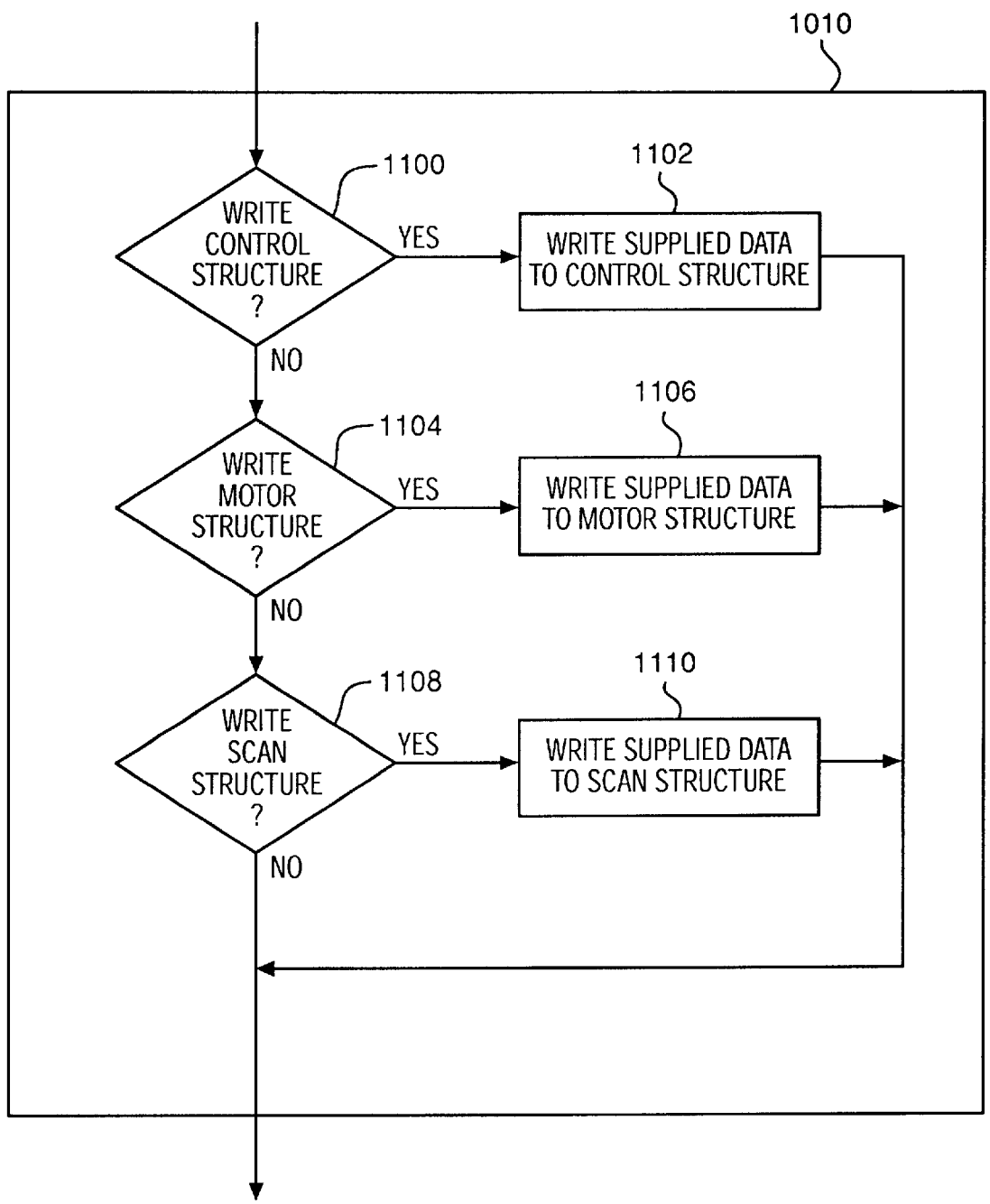
FIG. 11 is a flowchart describing additional details of the operation of elements in FIG. 10.

FIG. 11 is a flow chart providing additional details of the operation element 1010 in performing a write control instruction sequence for an identified predefined data structure. Specifically, elements 1100 and 1102 are operable to perform processing required to write host supplied data in the control/status data structure. If element 1100 determines that the control instruction sequence requests the write of data to the control/status data structure, element 1102 is next operable to write the supplied data into the identified control/status data structure. Processing is then completed for element 1010. If element 1100 determines the request is not for the write of the control/status structure, element 1104 is next operable to determine whether the control instruction sequence is requesting to write host supplied data to the motor data structure. Is so, element 1106 is next operable to write the host supplied data to the motor data structure thereby completing processing of element 1010. If element 1104 determines that the control instruction sequence is not requesting the write of data to the motor data structure, element 1108 is next operable to determine if the request is for writing data to the scan data structure. If so, element 1110 is next operable to write the host supplied data to the identified predefined scan data structure, thereby completing operation of element 1010. As above, details of the structure and semantic interpretation of these and other data structures is provided herein below.

Figure 12:
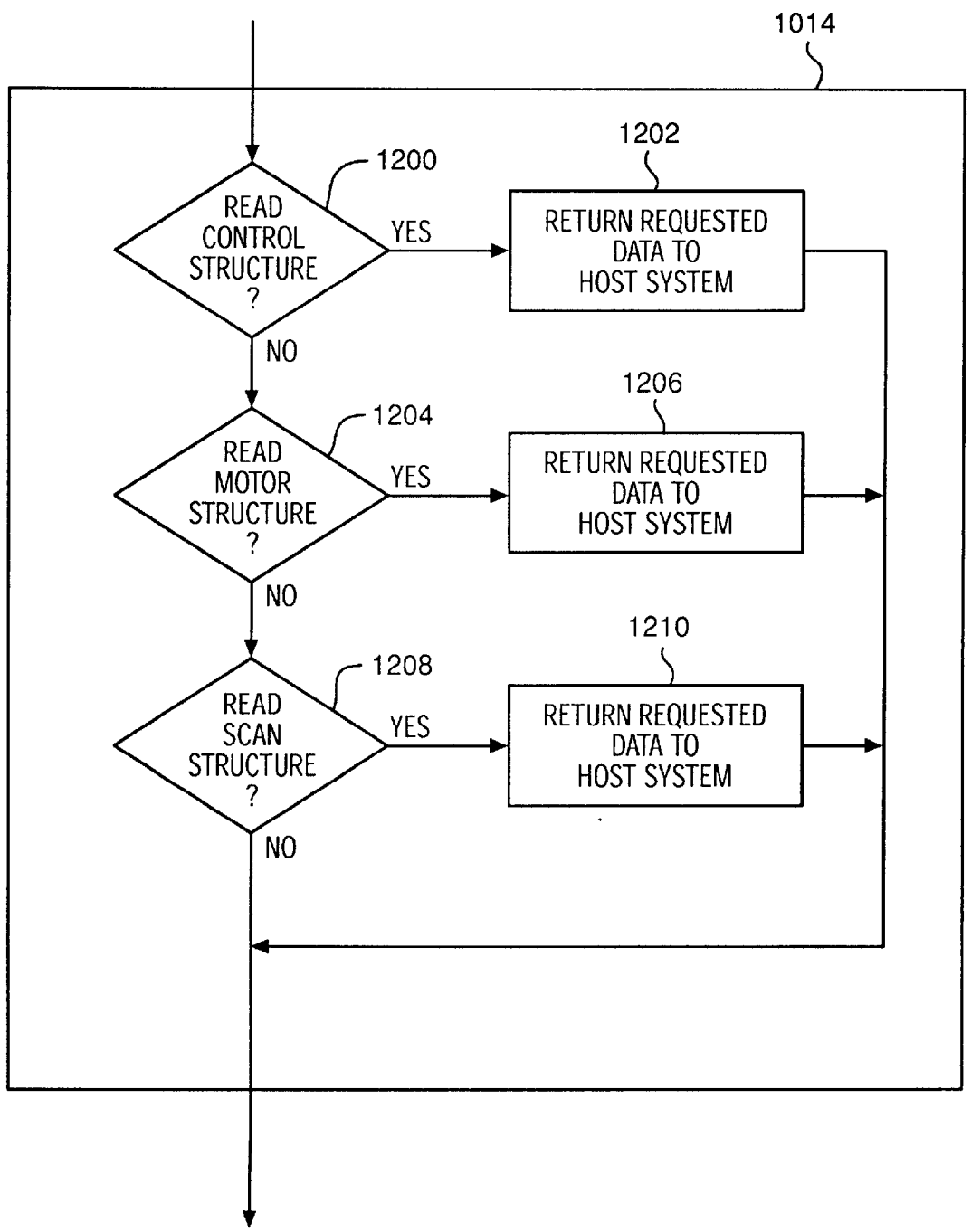
FIG. 12 is a flowchart describing additional details of the operation of elements in FIG. 10.

FIG. 12 is a flow chart describing the operation of element 1014 in additional detail for processing control instruction sequences requesting the read of data from a predefined data structure. Specifically, element 1200 first determines whether the control instruction sequence is requesting the read of the control/status data structure. If so, element 1202 is next operable to return the requested data from the predefined control/status data structure, thereby completing operation of element 1014. If element 1200 determines that the control instruction sequence is not requesting the read of the control/status data structure, element 1204 is next operable to determine if the sequence requests reading of the motor data structure. If so, element 1206 is operable to retrieve the requested data from the predefined motor data structure and return the data to the requesting host system, thereby completing processing of element 1014. If element 1204 determines that the control instruction sequence is not requesting a read of the motor data structure, element 1208 is next operable to determine whether the sequence requests reading data from the scan data structure. Is so, element 1210 is operable to retrieve the requested data from the scan data structure and to return the data to the requesting host system, thereby completing operation of element 1014.

Figure 13:
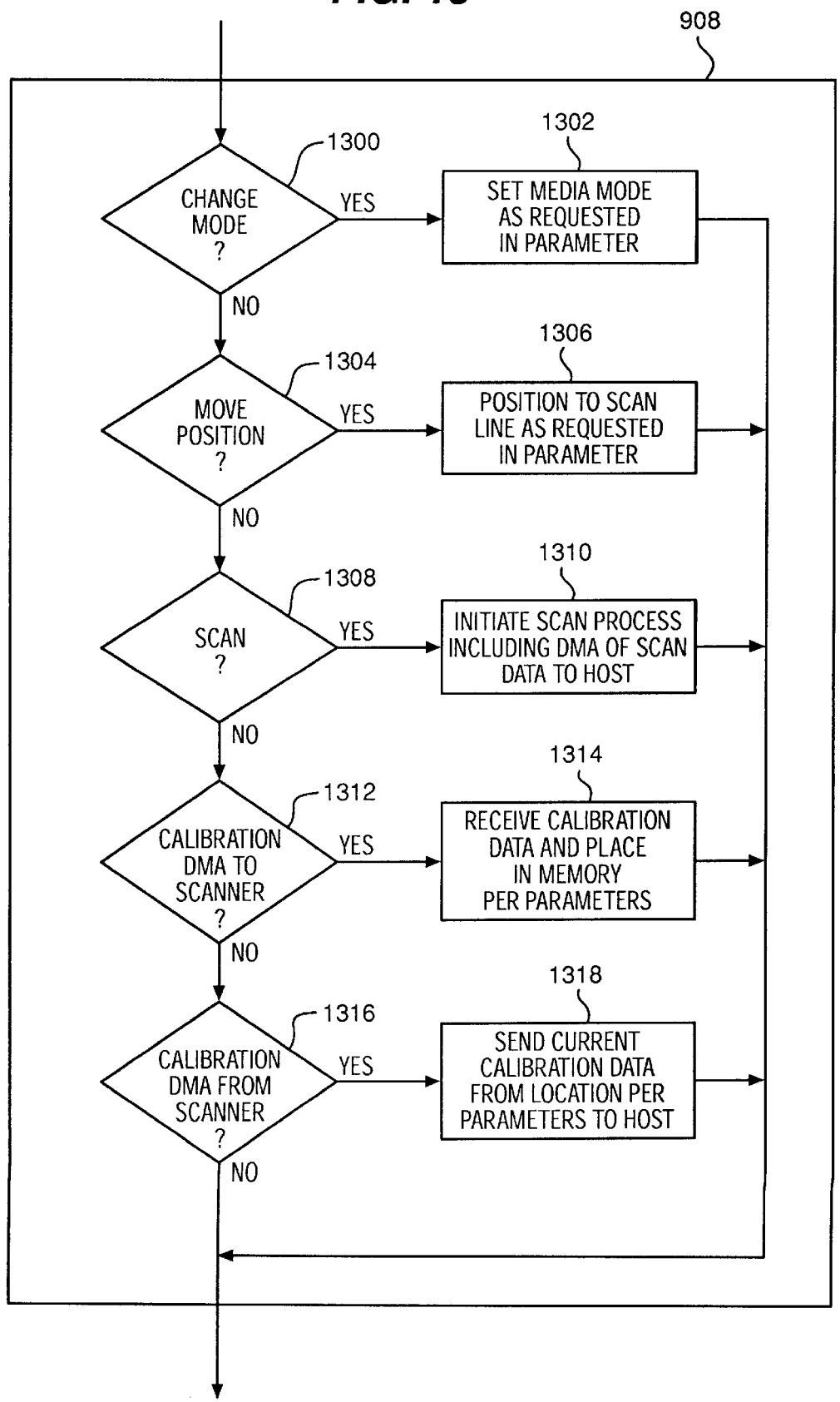
FIG. 13 is a flowchart describing additional details of the operation of elements in FIG. 9.

FIG. 13 is a flow chart describing the operation of element 908 in additional detail for processing of control command low-level control instruction sequences received from host computer. Element 1300 is first operable to determine whether the received control command is requesting the change of media mode. As noted herein below, the media mode identifies the type of image media source presently inserted into the scanning device. If element 1300 so determines that the control request is for changing the media mode, element 1302 is operable to set the media mode as requested by the parameter supplied with the change mode control command. Processing of element 908 is thereby completed. Elements 1304 and 1306 likewise determine whether the command is requesting a move position within the scanner device, and process such a move request in accordance with the parameter supplied in the move position command. Elements 1308 and 1310 are similarly operable to process a scan control command which initiates the scanning process of an image source presently inserted in the scan device and returns the digitized image data to the requesting host. Elements 1312 and 1314 are operable to process a request from the host computer to download calibration data via the high-speed DMA operation. Such a request transmits predefined calibration parameters from the host computer to the scanner control module and stores the calibration data within the buffer RAM of the scanner control module. Elements 1316 and 1318 are similarly operable to process a host request to retrieve presently stored calibration data from the scanner and to return the calibration data to the host computer. Further details of the operation of these and other control command sequences are provided herein below.

SPL Command Syntax and Semantic

As described above, the present invention includes host based API software modules which translate high-level command sequences into low-level control instructions sequences. In the preferred embodiment of the present invention, the high-level command language is a subset of the Hewlett-Packard SCL standard for scanning devices and the low-level control instruction standard is the Scanner Primitive Language (SPL) defined herein. Most, but not all, SCL language features are supported by equivalent SPL low-level control instruction sequences. The following list presents the SCL features presently supported by SPL as defined herein. Those skilled in the art will recognize that other SCL commands and parameters may be easily constructed from the SPL sequence. The definition herein is therefore intended merely as exemplary of a sufficient (though not necessarily minimal) SCL to SPL translation.

---

SCL API Functions Supported by SPL

```
INT16 InquireModel(PINT16 pModel)
INT16 InquireNumber(UINT16 Inquire,UINT16 Kind,PINT16 pValue)
INTI6 InquireOldestError()
INT16 InquireString(UINT16 Inquire,PUINT8 pString, INT16 Length, PINT16
  pReceived)
INT16 SendCommand(UINT16 Command,INT16 Value)
INT16 Color(INT16 Bits)
INT16 CommandInquire(UINT16 Command,INT16 Value,PINT16 pInquire)
INT16 Download(INT16 Kind,PUINT8 pBuffer)
INT16 GetScanInfo(PSCANINFO pScanInfo)
INT16 GetScanState(PSCANSTATE pScanState,UINT16 Kind,UINT16 Units)
INT16 ResetScanner(void)
INT16 Scan(INT16 Phase,PUINT8 pBuffer,INT32 Length,PINT32 pReceived)
INT16 SetPixelWindow(INT16 X,INT16 Y,INT16 Xextent,INT16 Yextent)
INT16 SetResolution(INT16 Xresolution,INT16 Yresolution)
INT16 SetScale(INT16 Xscale,INT16 Yscale)
INT16 SetScanState(PSCANSTATE pScanState,UINT16 Units)
INT16 SetScanWindow(PSCANWINDOW pScanWindow,UINT16 Units)
INT16 Upload(INT16 Kind,PUINT8 pBuffer,INT16 Length,PINT16 pReceived)
INT16 CheckIO(void)/* does nothing */
INT16 ScannerLock(HWND hWnd, INT16 block)
void ScannerVersion(PUINT8 pVersion, INT16 MaxCount
```
Supported Upload/Download Types (Kind):

```
SL_MATRIX_LOAD
SL_CAL_STRIP_LOAD
SL_10TO8BIT_LOAD
```

-continued

SL_GAINS_LOAD
    SL_EXPOSURE_LOAD
    SL_CAL_DATA_LOAD

SCL API Functions NOT Supported by SPL

The entry points for these commands will remain in the SPL DLL but they will not do anything and will return an error;

INT16 BuildCommand(PUINT8 pCmdString, UINT16 Command, INT16 Value)
    INT16 BuildInquire(PUINT8 pInqString,UINT16 Inquire,UINT16 Kind)
    INT32 SendToScanner(PUINT8 pBuffer, INT32 Length)
    INT32 RecFromScanner(PUINT8 pBuffer, INT32 Length, INT16 TermChar)
    INT16 ReceiveResponse(PUINT8 pInqString,PINT16 pValue,INT16 TermChar)
    INT16 SetDiagnosticSCL(PSCL_TABLE pTable)
    INT16 SetDecipointWindow(INT16 X,INT16 Y,INT16 Xextent,INT16 Yextent)
    INT16 GrayScale(INT16 Bits)
    INT16 Threshold(void)
    INT16 ColorDither(INT16 Pat)
    INT16 ColorThreshold(void)
    INT16 Dither(INT16 Pat)

SCL Command Defines Supported

SL_RESET_SCANNER
    SL_CLEAR_ERRORS
    SL_SCAN
    SL_RECALIB
    SL_X_RESOLUTION
    SL_Y_RESOLUTION
    SL_X_SCALE
    SL_Y_SCALE
    SL_XPOS_PIXEL
    SL_YPOS_PIXEL
    SL_XEXT_PIXEL
    SL_YEXT_PIXEL
    SL_NEGATIVE
    SL_MIRROR
    SL_AUTO_BACKGROUND
    SL_DATA_TYPE valid types: GRAYSCALE COLOR
    SL_BITS_PER_PIXEL
    SL_TONEMAP
    SL_TEST_LAMP
    SL_TEST_SCANNER
    SL_FILTER
    SL_MATRIX
    SL_ADF_UNLOAD
    SL_ADF_AVAILABLE
    SL_ADF_HAS_PAPER
    SL_ADF_OPENED
    SL_ADF_UNLOAD_RDY
    SL_ERR_MAX_DEPTH
    SL_ERR_DEPTH
    SL_ERR_CURRENT
    SL_ERR_OLDEST
    SL_PIXELS_PER_LINE
    SL_BYTES_PER_LINE
    SL_LINES_PER_SCAN
    SL_ADF_READY
    SL_PIXELS_PER_INCH
    SL_OPTICAL_RES
    SL_XPA_AVAILABLE
    SL_DATE_CODE
    SL_SCAN_STATUS
    SL_CAL_MODE
    SL_COMPRESSION
    SL_MEDIA_TYPE
    SL_COORD_SYSTEM
    SL_SCAN_DIRECTION SCL Command Defines NOT Supported SL_ADF_SCAN
    SL_UPLOAD       /* Use API call instead, Inquire works */
    SL_DOWNLOAD    /* Use API call instead, Inquire works */
    SL_DOWNLOAD_TYPE /* Inquire works, but command makes no sense */
    SL_ADF_BACKGROUND -continued SL_XPA_SCAN
SL_XPOS_DECI SCAN
SL_YPOS_DECI SCAN
SL_XEXT_DECI SCAN
SL_YEXT_DECI SCAN
SL_PATTERN
SL_COLOR_PATTERN
SL_ADF_CHANGE
SL_XPA_DISABLE
SL_ADF_STATUS
SL_XPA_STATUS
SL_XPA_READY
SL_BYTEORDER
SL_RECONNECT_LEVEL
SL_BYTES_IN_LASTSCAN
SL_NUM_OF_VIEWS
SL_VIEW_TYPE
SL_CLEAR_BUTTON
SL_BUTTON_PUSHED
SL_ADF_PRELOAD
SL_CALIB_Y
SL_CALIB_PARAM
SL_LIGHT_POWER
SL_SHOULD_BE
SL_MODEL_1
SL_MODEL_2
SL_MODEL_3
SL_MODEL_4
SL_MODEL_5
SL_MODEL_6
SL_MODEL_7
SL_MODEL_8
SL_MODEL_9
SL_MODEL_10
SL_INTENSITY
SL_CONTRAST
SL_YPOS_BAR
SL_SPEED_MODE
SL_SCAN_SPEED
SL_WHICH_ADF
SL_AUTO_COEF
SL_CONVOLUTION_COEFF SPL Commands The following tables define the syntax of the presently defined SPL commands. SPL commands and associated parameters and data are preferably transferred to the scanner via the USB data pipe (commonly referred to as a USB bulk pipe). Data generated by the scanner for return to the host system in response to the command processing are also transferred via the USB data pipe. As noted herein below, asynchronous event information corresponding to state changes in the scanner are communicated via the USB interrupt pipe so as to permit transfer of such information independent of the present state of the data pipe. SPL commands (also referred to herein as control instructions or low level control instructions) are retrieved from the USB data pipe until the pipe is empty. The host I/O processing module within the scanner firmware then suspends awaiting further control instructions from the attached host system.

| Command | Value | Parameters |
|---|---|---|
| Simple SPL Commands | | |
| NOOP | 0 × 00 | No Parms |
| WRITE REGISTER | 0 × 01 | UINT16 Address, UINT8 Data |
| WRITE_PORT | 0 × 02 | UINT16 Address, UINT16 Length, UINT8 Data |
| WRITE_MEM | 0 × 03 | UINT16 Address, UINT16 Length, UINT8 Data |
| READ_REGISTER | 0 × 04 | UINT16 Address |
| READ_PORT | 0 × 05 | UINT16 Address, UINT16 Length |
| READ_MEM | 0 × 06 | UINT16 Address, UINT16 Length |
| Control SPL Commands | | |
| CHG_MODE | 0 × 10 | UINT8 Mode |
| MOVE_POSITION | 0 × 11 | UINT16 Position |
| SCAN_IN_PLACE | 0 × 12 | No Parms |
| MOVE_AND_SCAN | 0 × 13 | No Parms |

-continued

| | | |
|---|---|---|
| DMA_TO_SCANNER | 0 x 15 | UINT16 Address, UINT16 Length |
| DMA_FROM_SCANNER | 0 x 16 | UINT16 Address, UINT16 Length |
| SPL_RESET | 0 x 17 | No Parms |
| | | Special SPL Commands |
| SWITCH_CODE | 0 x 08 | void code * Address |
| WRITE_EXT_MEM | 0 x 0a | UINT8 Cmd, UINT8 type, UINT16 Address, UINT16 Length |
| READ_EXT_MEM | 0 x 0b | UINT8 Cmd, UINT8 type, UINT16 Address, UINT16 Length |

Extended memory types (for WRITE_EXT_MEM or READ_EXT_MEM commands)

| Memory Type | Value |
|---|---|
| XRAM_TYPE | 0 |
| CODE_TYPE | 1 |
| IRAM_TYPE | 2 |
| SPECIAL_TYPE | 3 |
| EEPROM_TYPE | 4 |

Extended memory addresses (for SPECIAL_TYPE memory types)

| Memory Address | Value |
|---|---|
| SCAN_CONTROL_ADR | 0 x 00 |
| VERSION_ADR | 0 x 01 |
| LIGHT_ADR | 0 x 02 |
| ADC_ADR | 0 x 03 |
| Not Used | 0 x 04 |
| MEDIA_MODE | 0 x 05 |
| LIGHT_MONITOR | 0 x 06 |
| MOTOR_CONTROL_ADR | 0 x 07 |
| CONTROL_STATUS_ADR | 0 x 08 |
| DMA_LENGTH_ADR | 0 x 09 |
| PURPLE_ADR | 0 x 0a |
| MOTOR_ISR_ADDR | 0 x 0b |

Real Time Control

Real time control in the scanner control module of the present invention is interrupt driven and designed to be sequenced by a Task Level of the control module firmware. The Task Level polls global flags, data structures and variables for indications of events generated by various interrupts. When such events are detected, the Task Level handles the sequencing of the task to an appropriate next state (a simple finite state machine is thereby implemented to control operation of the scanner). A corresponding, cooperating Interrupt Level of the control module firmware retains some state information but generally has no knowledge of the specific task being performed, only the events that are un-masked for it to act on.

Various processes comprise the Task Level. Each process is largely independent of the others and all may operate substantially concurrently to control and sequence a particular sequence of processing within the scanner. The Task Level processes are preferably as follows:

HOST I/O Service Request

A host interface (i.e., USB/SCSI) needs service. This could be a control instruction "packet" received or a request to send scan data to the host.

Scan Event

An Event has been generated by the End Of Line interrupt.

Motor Event

An Event has been generated by the Stepper Motor interrupt.

User Event

A button has been pushed or the Lid opened

Timer Event

A timer has expired.

In general, the processes of the Task Level are idle awaiting indication of a particular event sensed by operation of the Interrupt level. Such interrupts are generally asynchronous with respect to the processes of the Task Level.

Scanner Data Structures

As noted above, the host API module transfers SPL commands to the scanner. The SPL command architecture is substantially based upon the ability of the host API module to directly (via SPL commands) read and write data in the memory space of the scanner firmware. In particular, various data structures are defined which correspond to particular control features and aspects of the scanner operation. Certain of the data structures also server as a repository for global information shared between the Task Level and Interrupt Level of the scanner firmware. The Task Level and Interrupt Level exchange information through certain of the following data strictures as described herein below.

Asynchronous Interrupts

Some of the Real Time Events must notify host API software that the device state has changed. This is reported through the USB Interrupt Pipe as distinct from the USB data pipe. Those skilled in the art will recognize equivalent "out of band" or priority communication techniques in other communication interface standards and protocols which may be used in conjunction with the present invention. The USB interrupt pipe is such an "out of band" or priority communication channel which allows higher priority information, generally of an asynchronous nature, to be exchanged between devices regardless of the present state of operation of the normal communication channel (i.e., the USB data pipe). Such status change reports are serviced by a background thread of the host API modules (i.e., asynchronous event processing module 220).

The present state of the scanner is reported and controlled by the Control/Status structure using the WRITE_EXT_MEM and READ_EXT_MEM commands. In response to receipt of a message at the host API indicative of a status change in the scanner, the host API module may read the control/status structure (by issuance of appropriate SPL commands) to determine with precision the present state of the scanner operation. By issuing SPL commands to write the control/status structure, the

| Control/Status Structure | | |
|---|---|---|
| Size | Name | Description |
| UINT8 | Mask | Mask allowing Device to service Events (see detail below) |
| UINT8 | Status | Current Status of the scanner (see detail below) |
| UINT8 | MediaType | Current Media Type (see detail below) |
| UINT8 | SensorMode | Current State of Media Sensor (see detail below) |

| Control/Status Mask Bits | | |
|---|---|---|
| Bit | Name | Description |
| 0 | MASK_EJECT_BUTTON_BIT | Set allows Device to service Eject Button Events |
| 1 | MASK_SELECT_BUTTON_BIT | Set allows Device to service Select Button Events |
| 2 | MASK_MEDIA_SENSE_BIT | Set allows Device to service Media Sensed Events |

| Control/Status Status Bits | | |
|---|---|---|
| 0 | AT_HOME_POS_BIT | Set after Device finds home, Clear if motor moves |
| 1 | LID_OPEN_BIT | Set when scanner lid is open |
| 2 | MEDIA_SENSED_BIT | Set when media sensed w/CCD |
| 3 | EOM_SENSED_BIT | Set when end of media is detected |

| Control/Status MediaType enumerated types | | |
|---|---|---|
| Value | Name | Description |
| 0 | UNKNOWN | MediaType is Unknown |
| 1 | NEGATIVE | MediaType is Negative |
| 2 | SLIDE | MediaType is Slide |
| 3 | PRINT | MediaType is Print |

| Control/Status Sensor Mode enumerated types | | |
|---|---|---|
| 0 | SENSOR_NOT_READY | Sensor is not ready... Needs calibration |
| 1 | SENSOR_READY | Sensor is calibrated and ready |
| 2 | SENSOR_MEDIA_INSERT | Media has been inserted |
| 3 | SENSOR_MEDIA_READY | Media has been pulled in and sensed w/CCD |
| 4 | SENSOR_WAIT_REMOVE | Media has been ejected Waiting for removal |

Control/Status and the Device Firmware

Depending on the state of the mask and status bits the control module firmware will monitor activity on the media sensors, buttons, and timer expiration and generate messages sent back to the host API background thread (asynchronous event processing module 220) to inform the host of the state changes.

The specific status masks and bits so monitored depend largely upon the requirements of a specific scanner device. The above discussed data structure and bit and field definitions are exemplary of one specific scanner device. Those skilled in the art will recognize variations of the above identified status bits, masks, and other status fields appropriate for other specific scanner devices. The host API module (scanner specific DLL 202) is therefore customized to the specific requirements and features of the specific scanner for which it is designed.

The above identified masks and status bits correspond to the following semantic processing.

At Home Position

When first set because of an eject or mode change, the media sensor is calibrated for the current media mode. If the calibration fails the sensor mode is set to Sensor Not Ready else it is set to Sensor Ready. A timer is setup to expire every second. In response to the timer expiration, the control module firmware performs a quick check of the media sensor to ensure proper threshold for the current media mode. If the Mask byte has the Media Sense Bit set, then the task level loop will check for media inserted every iteration. Eject and Select buttons are also allowed at the home position. When the home position is cleared, the Select Button is disabled. Whenever one of the mask bits are cleared and the user activates that event, all scanner panel lights will flash on to notify the user that the function is disabled (i.e., some media is currently inserted and the user therefore illegally attempted to change media mode).

Lid Open

When first set from the interrupt, all masks should be disabled and remain disabled until the Lid is closed (including any requisite debouncing of the signal). This will prevent the media sense that occurs because the light circuit is broken. An interrupt is sent to the host API software to update the status to indicate "lid open" for an error condition for the application.

Media Control

When first set an interrupt is sent to the host API software to update the status as ADF Ready (simulating a document feeder ready signal). A host application polls for this status in the push model for notification that it can begin scanning. Early notification that the media sensor has been tripped can be found in the Sensor Mode by looking at the state equal to Sensor Media Insert but if detection by the CCD fails Device Firmware will return to the Home Position.

Motor Task

The Motor Task is responsible for changing modes and repositioning for scanning. A Motor Control structure is downloaded using the WRITE_EXT_MEM command to define the parameters needed for a specific task. The structure may also be read using a READ_EXT_MEM command to determine the present status of the motor in the scanner device.

| Motor Control Structure | | |
|---|---|---|
| Size | Name | Description |
| UINT8 | Mode | Normal, Continuous |
| UINT8 | Direction | Preview, Final |
| UINT16 | Position | Defines current position in steps |
| UINT32 | DestVelocity | The period in 36 Mhz clocks to step at |
| UINT16 | StartStopAdj | Steps from buffer full location to re-start location |
| UINT16 | RepositionLimit | Step reverse limit to prevent losing media |
| UINT32 | Exposure | Scan exposure in 36 Mhz clocks |
| UINT16 | MaxSlideWindow | Max value to define the cam window as Slide |
| UINT16 | MaxNegWindow | Max value to define the cam window as Negative |
| UINT16 | MaxPrintWindow | Max value to define the cam window as Print |

The Motor Task (a process of the Task Level) cooperates with the Interrupt Level as noted above via shared global variables and data structures. The following data structures provide such shared variable communication between the Motor Task and the interrupt level as relates to motor control functions.

Motor ISR Control Structure

This structure is specific for the Device and is used to pass information between the Task Level and Motor Timer Interrupt. This structure contains State and Event information used to sequence the scan process to completion.

| Size | Name | Description |
|---|---|---|
| UINT8 | State | Current Motor Timer Interrupt State |
| UINT8 | NextState | Semaphore used by Task Level to sequence ISR to another State |
| UINT8 | Event | Bitmap of ISR generated events used by the Task Level |
| UINT8 | EventMask | Bitmap of Masks allowing ISR to set these events. |
| UINT8 | AccelIdx | Pointer to current Acceleration Table entry. |
| UINT16 | StepDir | Signed direction added to current position on each step. |
| UINT16 | EventWord | 16 bit parameter for passing info between Task and ISR |
| UINT32 | Velocity | Misnomer for the period in 36 Mhz clock ticks between interrupts. |

Motor Task Level States

| State | Value |
|---|---|
| STOPPED | 0 × 00 |
| GET_OUT_OF_WINDOW | 0 × 01 |
| GET_WINDOW_STEPS | 0 × 02 |
| GET_INTO_WINDOW | 0 × 03 |
| MOVE_TO_POSITION | 0 × 04 |
| REPOSITION_REV | 0 × 05 |
| REPOSITION_FWD | 0 × 06 |
| MOTOR_SCAN | 0 × 07 |
| FARAWAY_SCAN | 0 × 08 |
| INITIAL_REPOSITION | 0 × 09 |

Motor ISR States

STOPPED 0 × 00
ACCELERATE 0 × 01
CRUISE 0 × 02
SCAN_CRUISE 0 × 03
CONTINUE 0 × 04
DECELERATE 0 × 05
DECELERATE_TO_SCAN 0 × 06

Motor ISR Events

| Event | Value |
|---|---|
| MOTOR_STOPPED | 0 × 01 |
| AT POSITION | 0 × 02 |
| CROSSED_WINDOW | 0 × 04 |
| EXIT_WINDOW | 0 × 08 |
| ENTER_WINDOW | 0 × 10 |
| MAX_STEPS | 0 × 20 |
| LAST_WINDOW | 0 × 80 |

Scan Control

The Scan Task is responsible for repositioning for scan, sensing media, starting the RGB channels with appropriate line delays, and handling the buffer full condition. A Scan Control structure is downloaded using the WRITE_EXT_MEM command to define the parameters needed for a scan. The structure may also be read by the host system using a READ_EXT_MEM to monitor the present state of a scan operation.

Scan Control Structure

| Size | Name | Description |
|---|---|---|
| UINT16 | LinesToScan | Number of lines to scan |
| UINT8 | StartChannel | First Channel to start Filling, Inc Color, Proc |
| UINT8 | LineDelay1 | Delay in Bits 4-0 (up to 31) Fill Channel bit <1 |
| UINT8 | LineDelay2 | Delay in Bits 4-0 (up to 31) Fill Channel bit <1 |
| UINT16 | ScanPosition | Position in Motor Steps to start scanning |
| UINT16 | RepositionSteps | Number of steps to back up on buffer full |
| UINT16 | FarAwayPosition | Position to slow down to scan speed |

The Scan Task (a process of the Task Level) cooperates with the Interrupt Level as noted above via shared global variables and data structures. The following data structures provide such shared variable communication between the Scan Task and the interrupt level as relates to image scan functions.

Scan ISR Control Structure

This structure is specific for the Device and is used to pass information between the Task Level and End of Line Interrupt. This structure contains State and Event information used to sequence the scan process to completion.

| Size | Name | Description |
|---|---|---|
| UINT8 | State | Current End of Line Interrupt State |
| UINT8 | NextState | Semaphore used by Task Level to sequence ISR to another State |
| UINT8 | Event | Bitmap of ISR generated events used by the Task Level |
| UINT8 | EventMask | Bitmap of Masks allowing ISR to set these events. |
| UINT8 | DelayCnt | General purpose counter used for line delays, startup/finish delays. |
| UINT16 | ScannedLines | Number of lines that have currently been scanned |
| UINT16 | EventWord | 16 bit parameter for passing info between Task and ISR |

Scan Task Level States

| State | Value |
|---|---|
| STOPPED | 0 × 00 |
| SCANNING_IN_PLACE | 0 × 01 |
| SCAN_WHILE_MOVING | 0 × 02 |
| UTILITY_LMW_SCAN | 0 × 03 |
| LMW_SENSE_MEDIA | 0 × 04 |

Scan ISR States

| STOPPED | 0 × 00 |
|---|---|
| REPOSITIONING | 0 × 01 |
| RESYNCING | 0 × 02 |
| SCANNING | 0 × 03 |
| WAIT_EMPTY | 0 × 04 |
| WAIT_RESTART | 0 × 05 |
| FINISH_DELAY | 0 × 06 |
| RESTART_MOTOR | 0 × 07 |

Scan ISR Events

| Event | Value |
|---|---|
| MEDIA_SENSED | 0 × 01 |
| MEDIA_NOT_SENSED | 0 × 02 |
| EJECT_SENSED | 0 × 04 |
| SCAN_DONE | 0 × 08 |

| | -continued | |
|---|---|---|
| BUFFER_FULL | | 0 × 10 |
| BUFFER_EMPTY | | 0 × 20 |
| AT_SCAN_POSITION | | 0 × 40 |

General Purpose Timer

The microcontroller of the scanner device of the present invention preferably has two or more timers that can be configured for different functionality. For example, in an 8051 or 8052 microcontroller, a first timer is preferably implemented as a 16 bit Mode 1 timer. This mode divides the processor clock by 12 to generate a clock that continuously interrupts every time the 16 bit counter rolls over. This gives an interrupt every (65536*1 usec) 65.5 msec in the preferred embodiment of the present invention. This time is used to de-bounce the buttons, flash the light when changing mode, timeout media insertions and the 1 second check of the media sensor. Those skilled in the art will recognize many equivalent techniques and devices (including distinct timer devices as well as microcontrollers and general purpose processors) for implementing similar timing functions in the scanner device in accordance with the present invention. The timer operations use a data structure for maintaining the information for these events.

| Timer0 Control Structure | | |
|---|---|---|
| Size | Name | Description |
| UINT8 | State | Current Timer Interrupt State |
| UINT8 | Event | Bitmap of ISR generated events used by the Task Level |
| UINT8 | EventMask | Bitmap of Masks allowing ISR to set these events. |
| UINT8 | TimerTicks | Interrupts to count down for General purpose timer operations. |
| UINT8 | EjectTicks | Interrupts to count down for debouncing the Eject button |
| UINT8 | SelectTicks | Interrupts to count down for debouncing the Select button |
| UINT8 | CalSenseTicks | Interrupts to count down for checking the media sensor |

| Timer ISR States | |
|---|---|
| State | Value |
| STOPPED | 0 × 00 |
| FLASHING | 0 × 01 |
| POSITIONING | 0 × 02 |
| WARNING | 0 × 03 |

| Timer ISR Events | |
|---|---|
| Event | Value |
| TIMER_EXPIRED | 0 × 01 |
| EJECT_PUSHED | 0 × 02 |
| SELECT_PUSHED | 0 × 04 |
| CAL_SENSOR | 0 × 08 |

Calibration Strategy

In accordance with the present invention, a Complete Calibration will be done at power-on and at any mode change for transmissive modes. A Print Calibration will be done at installation and stored on the host computer. This will give valid Photo Response Non-Uniformity (PRNU as discussed below) values to be applied later. Before every scan, Dark Signal Non-Uniformity (DSNU as discussed below) values are calculated and combined with previous PRNU values. The Calibration Header Structure defines all the Target values and adjustable values available to and accessible by the host API to setup a Calibration and a Scan. Calibration generally involves several scans as described below.

Media Sensor

Scanner device control firmware, in accordance with the present invention, is responsible for calibrating the Media Sensor because of the real time requirement of continuously checking for drift. The Media Sensor preferably uses two simple analog to digital conversion circuits within the digital ASIC such as pulse width modulation circuits (also known as PWM's) to check the amount of light transmitted through a photo emitter/collector (often referred to as a light pipe) associated with the media insertion path. The Pulse duration register in the first PWM circuit has 10% increments and is the course control preferably programmed within the digital ASIC of the scanner control module. The other PWM circuit has a period register programmed in the digital ASIC and a duty cycle register also programmed in the digital ASIC. The calibration process first checks the extremes to verify the sensor works. If the current mode is print then the sensor should sense complete blockage of all light within the scanner (indicative of a print media blocking light from the scanner light source incident upon the CCD array) or the extreme of maximum light (indicative of the absence of a print media). In the transmissive mode (i.e., photographic slides or negatives and transparencies) the scanner control module in accordance with the present invention attempts to set the Media Sensor for a 10% change in light for sensing negatives.

The sensor calibration procedure is to start with some initial mid-way settings then move the course adjust until the sense input changes state. The fine adjust (period) is then moved to get the exact trip point and then the course adjust is set 1 click higher giving the 10% threshold.

The Sensor Mode in the control/status structure discussed above is set to Sensor Ready and a timer started to interrupt the microcontroller every second to verify the setting. This check procedure limits the course setting to +/−2 clicks. If that limit is exceeded, the Sensor Mode is set to Not Ready forcing a complete new calibration.

This method allows provides a self correcting technique such that if media is not sensed, the user will remove it and before the media is reinserted the sensor will be re-calibrated causing the media to be more likely sensed on the next insertion (re-insertion of the media).

Gain Calibration

The scanner control module in accordance with the present invention preferably attempts to maximize the analog signal with exposure and then balance the channels with gain when scanning printed images (as distinct from photographic slides or negatives or other transmissive mode media). This approach compensates for scanner device variations between the Red, Green, and Blue channels caused by the lamp, the CCD array, or the analog ASIC circuit components. Two scans are done with the first set at 100% exposure. The scan line is examined for the highest RGB value and this value is used to calculate an exposure that will maximize the CCD output. The CCD saturates at 3v whereas the analog ASIC and A/D converters generate all 1's (i.e., 0xFFF for a twelve bit A/D converter) when a 4v signal is converted. The exposure calculation attempts to set the CCD output at 90% of saturation using the equation 100*ExposureTarget/HottestRGBChannel where current ExposureTarget is (0.9*0xFFF*3/4). The second scan will be done at this calculated exposure and the scan line examined for high RGB values again. The analog ASIC preferably has a gain of 1–4 in 0.1 increments per gain value making the gain calculation ((10* GainTarget/HighRGBValue)−10).

DSNU Calibration

The digital ASIC preferably compensates for Dark Signal Non-Uniformity (DSNU) using a Calibration Ram value with the precision of ½ bit. The CCD array, in general and especially at extended exposures and high temperatures, requires more compensation at the lower pixel numbers than the higher. With dark clamp running the average dark level is subtracted before DSNU values and will tend to clip half the signal unless a bias is applied so that the full distribution can be seen. The scanner control module in accordance with the present invention therefore averages 100 scan lines to reduce noise to 1/10 when calculating DSNU values. Because of the exposure time for 100 scan lines (230 ms@100% exposure 1.38 sec@600% exposure), it is desired to only do one scan that determines the bias as well as the DSNU values. This is accomplished by scanning with the maximum bias of 1023 (½ bit), then finding the low value in the scan line and subtracting it from 1023 to get the scan bias. The DSNU values are then calculated by averaging the columns and then subtracting the bias.

PRNU Calibration

The digital ASIC preferably compensates for Photo Response Non-Uniformity (PRNU) using a Calibration Ram value that provides the gain by which the pixel value is multiplied. Again, 100 scan lines are averaged and the gain per RGB pixel is calculated by the equation RGBPrnuTarget/Average where RGBPrnuTarget value is a number determined by the calibration header structure.

Calibration Download Type

Calibration Data can be downloaded with and without the data. The size of the calibration download request serves to further identify the type of data to be downloaded. A header portion of the calibration data may be downloaded with a length of 100. In the preferred embodiment, a length of 1024 is indicative of a request to download EEPROM data. The first two bytes of the downloaded data indicate the size of the download request. The DMA calibration data to scanner command identifies the address in the buffer RAM at which the calibration data is to be stored. The host API software therefore determines the amount of buffer RAM used for buffering scan data being sent to the host system by determining the start address of the calibration data in the buffer RAM. Memory below the start of calibration data in buffer RAM is used for buffering the transmission of scan data to the host.

Calibration Download Format

| Byte | Description | Format |
|---|---|---|
| 0–1 | Size (100 or 24436) | UINT16 |
| 2–5 | Revision | ASCII String |
| 6–15 | SerialNumber | ASCII String |
| 16 | MediaType | UINT8 |
| 17 | Reserved | UINT8 |
| 18 | GainTarget | UINT8 |
| 19 | RedGain | UINT8 |
| 20 | GrnGain | UINT8 |
| 21 | BluGain | UINT8 |
| 22 | RedOffset | UINT8 |
| 23 | GrnOffset | UINT8 |
| 24 | BluOffset | UINT8 |
| 25 | DarkClampNum | UINT8 |
| 26–27 | DarkClampBias | UINT16 |
| 28 | DsnuOffsetMod | UINT8 |

-continued

Calibration Download Format

| Byte | Description | Format |
|---|---|---|
| 29 | ExposureTarget | UINT8 |
| 30 | RedPrnuTarget | UINT8 |
| 31 | GrnPrnuTarget | UINT8 |
| 32 | BluPrnuTarget | UINT8 |
| 33 | IndependentExposure | UINT8 |
| 34–35 | ExposureLen | UINT16 |
| 36–37 | RedExposure | UINT16 |
| 38–39 | GrnExposure | UINT16 |
| 40–41 | BluExposure | UINT16 |
| 42–43 | StartX | UINT16 |
| 44–45 | EndX | UINT16 |
| 46–47 | CamWindowSteps | UINT16 |
| 48–49 | DarkBiasOffset | UINT16 |
| 50–99 | DarkBiasOffset | UINT16 |
| 100–8211 | RedCalData[2700] | UINT8 Offset UINT8 GainLSB UINT8 GainMSB |
| 8212–16323 | GrnCalData[2700] | UINT8 Offset UINT8 GainLSB UINT8 GainMSB |
| 16324–24435 | BluCalData[2700] | UINT8 Offset UINT8 GainLSB UINT8 GainMSB |

EEPROM Download Format

| Byte | Description | Format |
|---|---|---|
| 0–1 | Size (must be 1024) | UINT16 |
| 2 | EEProm Revision | UINT8 |
| 3 | Pad to align rest | UINT8 |
| 4–13 | Serial# | ASCII String |
| 14–15 | SlideCnt | UINT16 |
| 16–17 | NegativeCnt | UINT16 |
| 18–19 | PrintCnt | UINT16 |
| 20–21 | LeftPurpleRail | UINT16 |
| 22–23 | RightPurpleRail | UINT16 |
| 24–25 | SlideCamWindowMax | UINT16 |
| 26–27 | NegativeCamWindowMax | UINT16 |
| 28–29 | PrintCamWindowMax | UINT16 |
| 30–31 | MotorLash | UINT16 |
| 32–33 | PrintPositionX | UINT16 |
| 34–35 | PrintExtentX | UINT16 |
| 36–37 | TransmissivePositionX | UINT16 |
| 38–39 | TransmissiveExtentX | UINT16 |
| 40–41 | MotorStepsSensorToCCD | UINT16 |
| 42–255 | Reserved | |
| 256–511 | FrontEndRedMap[128] | UINT16 |
| 512–767 | FrontEndGrnMap[128] | UINT16 |
| 768–1023 | FrontEndBluMap[128] | UINT16 |

Those skilled in the art will recognize that the calibration data format described herein above is generic in that several scanner devices may be calibrated by such supplied data. None the less, those skilled in the art will further recognize that other types of calibration values may be used by specific scanning devices or specific optical characteristics of particular scanning devices. The above discussed formats are therefore specific to a particular preferred scanning device and at the same time exemplary of a class of similar scanning devices.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A control apparatus in an image scanner comprising:
    a host computer interface for exchanging information with an attached host computer; and a process control module for controlling real time operations of the image scanner wherein said process control module is adapted to accept low-level control instructions received from the attached host computer via said host computer interface wherein said process control module includes at least one control/status data structure directly addressable by the host computer by said low-level control instructions for control of the state of the image scanner by the host computer and for reporting the state of the image scanner to the host computer.

2. The apparatus of claim 1 wherein said process control module includes:

a memory device for storing said at least one control/status data structure used to control operation of the image scanner, wherein said at least one control/status data structure includes a plurality of control structures stored in said memory device for configuring operating parameters of said image scanner.

3. The apparatus of claim 2 wherein said low-level control instructions include direct addressing and manipulation of said plurality of control structures by the attached host computer.

4. The apparatus of claim 1 wherein said low-level control instructions includes an instruction, generated by the host computer, to write host supplied information to said at least one data structure.

5. The apparatus of claim 1 wherein said low-level control instructions includes an instruction, generated by the host computer, to read information from said at least one data structure and to return said data to the host computer.

6. The apparatus of claim 1 wherein said control module further includes:

a motor control structure for control of a motor in the image scanner by the host computer and for reporting the state of said motor to the host computer.

7. The apparatus of claim 1 wherein said control module further includes:

a scan control structure for definition, by the host computer, of parameters of an image scan to be performed by the image scanner.

8. The apparatus of claim 1 wherein said apparatus includes a calibration data structure for storing data regarding calibration of the image scanner by the host computer and for reporting said data regarding calibration to the host computer.

9. The apparatus of claim 8 wherein said low-level control instructions includes an instruction, generated by the host computer, to write host supplied information to said calibration data structure.

10. A method for controlling an image scanner having a controller attached to a host computer comprising the steps of:

exchanging low-level control instructions between said controller and the host computer wherein said low-level control instructions include address information; and processing said low-level control instructions by accessing locations in at least one control/status data structure stored in a memory associated with said controller in accordance with said address information wherein said at least one control/status data structure is directly addressable by the host computer using said address information of said low-level control instructions for control of the state of the image scanner by the host computer and for reporting the state of the image scanner to the host computer.

11. The method of claim 10 wherein the step of processing said low-level control instructions includes the step of writing data supplied with said address information into said locations in said at least one control/status data structure stored in said memory.

12. The method of claim 10 wherein the step of processing said low-level control instructions includes the steps of:

reading data from locations in said at least one control/status data structure in said memory associated with said controller; and returning said data to the host computer.

13. The method of claim 10 wherein said at least one control/status data structure includes a plurality of control structures for configuring operating parameters of said image scanner.

14. The method of claim 13 wherein the step of processing said low-level control instructions include the step of:

manipulating said plurality of control structures by direct addressing by the attached host computer.

15. The method of claim 10 wherein the step of processing said low-level control instructions includes the step of:

writing information supplied by the host computer into said at least one data structure in response to receipt of a write command from the host computer.

16. The method of claim 10 wherein the step of processing said low-level control instructions includes the steps of:

reading information from said at least one data structure in response to receipt of a read command from the host computer; and returning said information to the host computer.

17. The method of claim 10 wherein said at least one data structure includes a control/status structure and wherein the step of processing said low-level control instructions includes the steps of:

writing information from the host computer into said control/status structure to control the state of the image scanner; and reading information from said control/status structure to report the status of the image scanner to the host computer.

18. The method of claim 10 wherein said at least one data structure includes a motor control structure and wherein the step of processing said low-level control instructions includes the steps of:

writing information from the host computer into said motor control structure to control a motor in the image scanner; and reading information from said motor control structure to report the status of the motor to the host computer.

19. The method of claim 10 wherein said at least one data structure includes a scan control structure and wherein the step of processing said low-level control instructions includes the step of:

writing information from the host computer into said scan control structure to define parameters of a scan to be performed by the image scanner.

20. A system for control of a scanner having a control module coupled to a host computer, said system comprising:

a memory in said control module having a plurality of memory locations for controlling operation of the image scanner;

a scanner control API library operable in said host computer for converting high-level scanner control commands provided as input to said API library into low-level control instructions in accordance with a scanner primitive language wherein said low-level control instructions consist essentially of: requests by the host computer to read data from memory locations from said control module, and requests by the host computer to write data to memory locations in said control module;

processing means in said control module for processing said low-level control instructions; and communication means, coupled to said control module and coupled to said host computer, for exchanging said low-level control instructions between the host computer and said control module.

21. The system of claim 20 wherein the means for processing comprises a microcontroller for receiving and processing said low-level control instructions by manipulating said memory locations in accordance with said low-level control instructions received from the host computer, and wherein said means for exchanging comprises a USB communication medium.

* * * * *